United States Patent
Radulescu et al.

(10) Patent No.: US 9,294,972 B2
(45) Date of Patent: Mar. 22, 2016

(54) NEIGHBOR RELATION INFORMATION MANAGEMENT

(75) Inventors: Andrei Dragos Radulescu, San Diego, CA (US); Dino Flore, Rome (IT); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 13/095,531

(22) Filed: Apr. 27, 2011

(65) Prior Publication Data
US 2012/0100884 A1  Apr. 26, 2012

Related U.S. Application Data
(60) Provisional application No. 61/328,856, filed on Apr. 28, 2010.

(51) Int. Cl.
*H04W 4/00* (2009.01)
*H04W 36/00* (2009.01)
(Continued)

(52) U.S. Cl.
CPC ...... *H04W 36/0083* (2013.01); *H04W 36/0055* (2013.01); *H04W 76/046* (2013.01); *H04W 92/20* (2013.01)

(58) Field of Classification Search
CPC .............................. H04L 47/10; H04W 80/04
USPC ........................................................ 455/524
See application file for complete search history.

(56) References Cited

U.S. PATENT DOCUMENTS 7,636,335 B2 * 12/2009 Rune ..................... H04L 45/02
  370/331
7,949,343 B2 *  5/2011 Kermoal ................ H04L 5/003
  455/452.2

(Continued)

FOREIGN PATENT DOCUMENTS

JP       2000505251 T    4/2000
JP       2006191625 A    7/2006
(Continued)

OTHER PUBLICATIONS

3GPP TS 36.331 V9.11.0 (Jun. 2012), 3rd Generation Partnership Project, Technical Specification Group Radio Access Network, Evolved Universal Terrestrial Radio Access (E-UTRA), Radio Resource Control (RRC), Protocol specification (Release 9), section 6.2.2, 650 Route des Lucioles—Sophia Antipolis Valbonne—France, pp. 32.

(Continued)

*Primary Examiner* — Hai V Nguyen
(74) *Attorney, Agent, or Firm* — Nerrie M. Zohn

(57) ABSTRACT

Neighbor relation information management involves, for example: acquiring, reporting, and exchanging neighbor relation information. In some cases, neighbor relation information is acquired and/or reported in a manner that does not significantly impact other functionality of the access terminal. For example, an access terminal may be configured to acquire and/or report neighbor relation information only during one or more defined radio states. In some cases, the acquisition of neighbor relation information is based on a neighbor relation threshold. In some cases, an access terminal does not immediately report measured neighbor relation information and instead stores the information for reporting at a later time. In some cases, a transmitted indication is used to facilitate retrieval of neighbor relation information from an access terminal. In some cases, neighbor relation information acquired from an access terminal is exchanged over a direct interface between access points.

22 Claims, 18 Drawing Sheets

(51) Int. Cl.
*H04W 76/04* (2009.01)
*H04W 92/20* (2009.01)

(56) References Cited

U.S. PATENT DOCUMENTS

| | | | | |
|---|---|---|---|---|
| 7,991,398 B2* | 8/2011 | Rune | ................ | H04L 45/02 370/352 |
| 8,165,597 B2* | 4/2012 | Han | ................ | H04W 16/10 370/329 |
| 8,238,267 B2* | 8/2012 | Dwyer | ............ | H04W 36/0022 370/254 |
| 8,359,033 B2* | 1/2013 | Diachina | .......... | H04W 36/0066 370/901 |
| 8,391,238 B2* | 3/2013 | Rune | ................ | H04W 48/16 370/331 |
| 8,462,742 B2* | 6/2013 | Song | ................ | H04L 63/08 370/338 |
| 8,494,526 B2* | 7/2013 | Kallin | ................ | H04J 11/0069 455/436 |
| 8,503,942 B2 | 8/2013 | Kazmi et al. | | |
| 8,570,981 B2* | 10/2013 | Aziz | ................ | H04W 36/245 370/332 |
| 8,600,390 B2* | 12/2013 | Vikberg | ............ | H04W 36/0066 455/436 |
| 8,606,288 B2* | 12/2013 | Dimou | ................ | H04W 92/20 370/331 |
| 8,620,320 B2* | 12/2013 | Bi | ................ | H04W 36/0061 370/331 |
| 8,630,648 B2* | 1/2014 | Rune | ................ | H04J 11/0093 455/436 |
| 8,639,243 B2* | 1/2014 | Radulescu | ........ | H04W 36/0083 370/237 |
| 8,660,575 B2* | 2/2014 | Fischer | ................ | H04W 60/04 455/435.2 |
| 8,737,359 B2* | 5/2014 | Catovic | ................ | H04L 5/003 370/332 |
| 8,837,399 B2* | 9/2014 | Johansson | ............ | H04W 48/16 370/329 |
| 8,842,633 B2* | 9/2014 | Dwyer | ............ | H04W 36/0083 370/331 |
| 2004/0141511 A1* | 7/2004 | Rune | ................ | H04L 45/20 370/401 |
| 2004/0151193 A1* | 8/2004 | Rune | ................ | H04L 29/06 370/401 |
| 2004/0153520 A1* | 8/2004 | Rune | ................ | H04L 12/4616 709/206 |
| 2004/0156318 A1* | 8/2004 | Rune | ................ | H04W 92/02 370/235 |
| 2004/0156384 A1* | 8/2004 | Rune | ................ | H04W 40/02 370/432 |
| 2004/0167988 A1* | 8/2004 | Rune | ................ | H04L 12/4616 709/238 |
| 2005/0002372 A1* | 1/2005 | Rune | ................ | H04W 74/06 370/346 |
| 2006/0211402 A1 | 9/2006 | Hofmann | | |
| 2007/0037581 A1* | 2/2007 | Morita | ................ | H04W 28/02 455/453 |
| 2007/0064686 A1 | 3/2007 | Bae et al. | | |
| 2007/0081493 A1* | 4/2007 | Rune | ................ | H04L 45/02 370/331 |
| 2007/0197222 A1* | 8/2007 | Rune | ................ | H04L 45/02 455/436 |
| 2007/0206535 A1* | 9/2007 | Sood | ................ | H04W 12/10 370/331 |
| 2007/0249352 A1* | 10/2007 | Song | ................ | H04L 63/08 455/436 |
| 2007/0287459 A1* | 12/2007 | Diachina | .......... | H04W 36/0066 455/436 |
| 2008/0108353 A1* | 5/2008 | Lee | ................ | H04W 36/0061 455/437 |
| 2008/0132225 A1 | 6/2008 | Ranta et al. | | |
| 2008/0132274 A1 | 6/2008 | Yoo et al. | | |
| 2008/0160918 A1 | 7/2008 | Jeong et al. | | |
| 2008/0176564 A1 | 7/2008 | Eerolainen | | |
| 2008/0198811 A1 | 8/2008 | Deshpande et al. | | |
| 2008/0207195 A1* | 8/2008 | Ranta | ................ | H04W 24/10 455/423 |
| 2008/0207207 A1* | 8/2008 | Moe | ................ | H04J 11/0093 455/439 |
| 2008/0227455 A1* | 9/2008 | Kim | ................ | H04W 36/0083 455/436 |
| 2008/0293419 A1* | 11/2008 | Somasundaram | | H04M 15/7657 455/437 |
| 2008/0318574 A1* | 12/2008 | Bi | ................ | H04W 36/0061 455/436 |
| 2009/0129291 A1 | 5/2009 | Gupta et al. | | |
| 2009/0176490 A1 | 7/2009 | Kazmi et al. | | |
| 2009/0219893 A1 | 9/2009 | Korpela et al. | | |
| 2009/0264130 A1 | 10/2009 | Catovic et al. | | |
| 2010/0003980 A1* | 1/2010 | Rune | ................ | H04W 48/16 455/436 |
| 2010/0069088 A1* | 3/2010 | Fischer | ................ | H04W 60/04 455/456.1 |
| 2010/0075667 A1* | 3/2010 | Nakamata | ........ | H04W 36/0055 455/432.3 |
| 2010/0142483 A1* | 6/2010 | Wu | ................ | H04M 15/00 370/331 |
| 2010/0184437 A1* | 7/2010 | Dimou | ................ | H04W 92/20 455/436 |
| 2010/0278161 A1* | 11/2010 | Ore | ................ | H04W 36/0083 370/338 |
| 2010/0297955 A1* | 11/2010 | Marinier | ........... | H04W 36/0061 455/73 |
| 2011/0110300 A1* | 5/2011 | Sachs | ................ | H04W 48/18 370/328 |
| 2011/0170481 A1* | 7/2011 | Gomes | ............ | H04W 36/0083 370/328 |
| 2011/0171979 A1* | 7/2011 | Rune | ................ | H04W 24/02 455/458 |
| 2011/0255514 A1* | 10/2011 | Olofsson | ............ | H04W 72/0426 370/331 |
| 2011/0263282 A1* | 10/2011 | Rune | ................ | H04J 11/0093 455/507 |
| 2012/0008512 A1* | 1/2012 | Wahlqvist | ......... | H04W 52/0232 370/252 |
| 2012/0009957 A1* | 1/2012 | Murasawa | ............. | H04W 8/26 455/507 |
| 2012/0093087 A1* | 4/2012 | Chen | ................ | H04L 45/025 370/328 |
| 2012/0106370 A1* | 5/2012 | Radulescu | ........ | H04W 36/0083 370/252 |
| 2012/0295606 A1* | 11/2012 | Sebire | ............... | H04W 36/0094 455/422.1 |
| 2013/0003646 A1* | 1/2013 | Michel | ............... | H04B 7/15592 370/315 |
| 2013/0035101 A1* | 2/2013 | Wang | ................ | H04W 36/08 455/437 |
| 2013/0065600 A1* | 3/2013 | Lim | ................ | H04W 36/0066 455/450 |
| 2013/0183959 A1* | 7/2013 | Mihaly | ................ | H04W 60/00 455/422.1 |

FOREIGN PATENT DOCUMENTS

| | | |
|---|---|---|
| JP | 2006262459 A | 9/2006 |
| JP | 2008503106 A | 1/2008 |
| JP | 2008512038 A | 4/2008 |
| JP | 2008166878 A | 7/2008 |
| JP | 2008219645 | 9/2008 |
| JP | 2009049545 A | 3/2009 |
| JP | 2009542104 A | 11/2009 |
| JP | 2011509050 A | 3/2011 |
| JP | 2011519505 A | 7/2011 |
| TW | 200704215 | 1/2007 |
| TW | 201014378 A | 4/2010 |
| WO | 9706648 A1 | 2/1997 |
| WO | 2006016690 A1 | 2/2006 |
| WO | 2006031055 A1 | 3/2006 |
| WO | 2008005225 A2 | 1/2008 |
| WO | WO2008044208 A2 | 4/2008 |
| WO | WO2008156304 A2 | 12/2008 |
| WO | 2009041498 A1 | 4/2009 |
| WO | 2009066622 A1 | 5/2009 |
| WO | WO2009088332 A1 | 7/2009 |

(56) References Cited

FOREIGN PATENT DOCUMENTS

| WO | WO-2009088877 A2 | 7/2009 | | |
| WO | WO2009096835 A1 | 8/2009 | | |
| WO | WO2009119699 A2 | 10/2009 | | |
| WO | WO-2009120127 A1 | 10/2009 | | |
| WO | WO 2010026438 A1 | * | 3/2010 | .......... H04J 11/0093 |
| WO | WO2010026438 A1 | 3/2010 | | |
| WO | 2011061990 A1 | 5/2011 | | |

OTHER PUBLICATIONS

3GPP TS 36.423 V9.6.0 (Mar. 2011), 3rd Generation Partnership Project, Technical Specification Group Radio Access Network, Evolved Universal Terrestrial Radio Access Network (E-UTRAN), X2 application protocol (X2AP) (Release 9), section 8.3.3-8.3.5, 650 Route des Lucioles—Sophia Antipolis Valbonne—France, pp. 6.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP Standard; 3GPP TS 36.300, 3rd Generation Partnership Project (3GPP), Mobile Competence Centre ; 650, Route Des Lucioles; F-06921 Sophia—Antipolis Cedex ; France, No. V9.3.0, Apr. 27, 2010, pp. 1-166, XP050441450, [retrieved on Apr. 27, 2010].

International Search Report and Written Opinion—PCT/US2011/034394—ISA/EPO—Sep. 30, 2011.

European Search Report—EP13184207—Search Authority—The Hague—Oct. 15, 2013.

Ericsson: "Logged MDT measurement reporting", 3GPP TSG-RAN WG2 #69bis, R2-101994, Apr. 12, 2010, pp. 1-2.

Samsung, "Procedure for logged MDT in idle", 3GPP TSG RAN WG2 #69bis, R2-102292, Apr. 12-16, 2010, Beijng, China, Agenda Item: 4.3.1, pp. 1-3.

3GPP TR 36.805, 3rd Generation Partnership Project; Technical Specification Group Radio Access Network; Study on Minimization of drive-tests in Next Generation Networks; Release 9, 3GPP, V1.2.0, Sep. 11, 2009.

Taiwan Search Report—TW100114931—TIPO—Aug. 15, 2014.

3GPP TS 25.331: "3rd Generation Partnership Project; Technical Specification Group Radio Access Network; Radio Resource Control (RRC); Protocol specification," 650 Route Des Lucioles- Sophia-Antipolis Cedex; France, Version 10.3.0, Release 10, Mar. 2011, pp. 1-1819, sections 10.3.7.129 and 10.3.7.131.

Ericsson: "Triggers for logged MDT measurement reporting", 3GPP TSG-RAN WG2 #69, San Francisco, USA, Tdoc R2-101426, pp. 1-3, Feb. 22-26, 2010.

3GPP TS 37.320: "3rd Generation Partnership Project; Technical Specification Group Radio Access Network; Evolved Universal Terrestrial Radio Access (E-UTRA), Overall description; Stage 2", Release 10, V0.4.0, R2-102667, Apr. 2010, pp. 1-11.

3GPP TS 25.331: "3rd Generation Partnership Project; Technical Specification Group Radio Access Network; Radio Resource Control (RRC); Protocol specification," 650 Route Des Lucioles- Sophia-Antipolis Cedex; France, Version 10.0.0, Release 10, Jun. 2010, Sections 10.2.57a, 10.3.7.42a, 8.1.3.6, 8.3.1.3, 8.4.2.2, 8.5.10, 10.2.7, 10.2.19, 10.2.41 and 10.2.60, pp. 658, 952, 103-107, 212-215, 306-308, 322-325, 542-545, 580-581, 617-618, 661-662.

3GPP TS 25.423: "3rd Generation Partnership Project; Technical Specification Group Radio Access Network; UTRAN Iur interface Radio Network Subsystem Application Part (RNSNAP) signalling", 650 Route Des Lucioles- Sophia-Antipolis Valbonne; France, Version 10.0.0, Release 10, Sep. 2010, Section 9.2.1.41, pp. 434-443.

3GPP TS 25.484: "3rd Generation Partnership Project; Technical Specification Group Radio Access Network; Automatic Neighbour Relation (ANR) for UTRAN; Stage 2", 650 Route Des Lucioles- Sophia-Antipolis Valbonne; France, Version 2.0.0, Release 10, Jun. 2011, Section 4 and 5, 5.5 and 5.3.1, pp. 7-14, 17-18.

3GPP TS 36.331: "3rd Generation Partnership Project; Technical Specification Group Radio Access Network; Evolved Universal Terrestrial Radio Access (E-UTRA); Radio Resource Control (RRC); Protocol specification", 650 Route Des Lucioles- Sophia-Antipolis Valbonne; France, Version 9.11.0, Release 9, Jun. 2012, Section 6.2.2 and 5.6.5, pp. 96-126, 87-88.

* cited by examiner

NEIGHBOR RELATION INFORMATION MANAGEMENT

CLAIM OF PRIORITY

This application claims the benefit of and priority to commonly owned U.S. Provisional Patent Application No. 61/328,856, filed Apr. 28, 2010, and assigned, the disclosure of which is hereby incorporated by reference herein.

CROSS-REFERENCE TO RELATED APPLICATION

This application is related to concurrently filed and commonly owned U.S. patent application Ser. No. 13/095,479, entitled "NEIGHBOR RELATION INFORMATION MANAGEMENT," and assigned, the disclosure of which is hereby incorporated by reference herein.

BACKGROUND

1. Field

This application relates generally to wireless communication and more specifically, but not exclusively, to managing neighbor relation information.

2. Introduction

A wireless communication network may be deployed over a geographical area to provide various types of services (e.g., voice, data, multimedia services, etc.) to users within that geographical area. In a typical implementation, access points (e.g., associated with one or more cells) are distributed throughout a network to provide wireless connectivity for access terminals (e.g., cell phones) that are operating within the geographical area served by the network.

In general, at a given point in time, an access terminal may be served by one of these access points. As the access terminal roams throughout this geographical area, the access terminal may move away from a serving cell and move closer to another cell. In addition, signal conditions within a given cell may change over time, whereby an access terminal may eventually be better served by another cell. To maintain access terminal connectivity under these circumstances, the access terminal may be handed-over from a serving cell to the other cell.

To facilitate these handovers and other operations, access points in a network may keep track of their neighbor access points (e.g., which may be potential targets for handover). For example, in conjunction with a handover to a neighbor access point, a serving access point may send context information that neighbor access point. To enable this context transfer, the serving access point may maintain neighbor relation information that identifies its neighbor access points and provides other information about these access points (e.g., information about the cell(s) associated with a given access point).

The neighbor relation information maintained at each access point may be managed by a centralized network management entity. For example, based on measurements conducted by system components and/or so-called "drive tests", a system administrator may attempt to identify the cells in the vicinity of a given cell and, based on this information, update the neighbor relation information maintained at that cell. In practice, however, such centralized and/or human-based schemes may not always identify all of neighbor cells of a given cell. Moreover, such schemes may involve relatively high operational and implementation costs and complexity.

Accordingly, there is a need for improved techniques for managing neighbor relation information.

SUMMARY

A summary of several sample aspects of the disclosure follows. This summary is provided for the convenience of the reader and does not wholly define the breadth of the disclosure. For convenience, the term some aspects is used herein to refer to a single aspect or multiple aspects of the disclosure.

The disclosure relates in some aspects to managing neighbor relation information. For example, several techniques are described for acquiring neighbor relation information at an access terminal, reporting this acquired neighbor relation information, and exchanging neighbor relation information between network entities. In some aspects, the teachings herein may be employed in automatic neighbor relation (ANR) operations whereby entities may autonomously (e.g., without human or network operator action) acquire, report, exchange, or update neighbor relation information.

The disclosure relates in some aspects to acquiring neighbor relation information at an access terminal in a manner that mitigates the impact this information acquisition has on other functionality of the access terminal. For example, an access terminal may log neighbor relation information in a manner that does not impact access terminal paging or other mobility behavior.

In some implementations, an access terminal acquires neighbor relation information during one or more radio states (e.g., IDLE state, CELL_PCH state, CELL_PCH state with DRX gaps, URA_PCH state, or CELL_FACH state). For example, the acquisition of neighbor relation information may comprise: determining that an access terminal is in a defined radio state; and conducting a measurement for neighbor relation information as a result of the determination that the access terminal is in the defined radio state.

The disclosure relates in some aspects to acquiring neighbor relation information based on a neighbor relation threshold. For example, an access terminal may be configured to only measure neighbor relation information when the signal received from one or more cells exceeds a threshold. Thus, the acquisition of neighbor relation information may comprise: maintaining a threshold for neighbor relation measurements; receiving a signal; comparing the received signal to the threshold; and determining, based on the comparison, whether to conduct a measurement for neighbor relation information.

The disclosure relates in some aspects to using an indication to facilitate retrieval of neighbor relation information from an access terminal. For example, a method of communication may comprise: acquiring neighbor relation information at an access terminal; and sending a message that indicates that the neighbor relation information is available for retrieval from the access terminal. As another example, a method of communication may comprise: receiving a first message from an access terminal, wherein the first message indicates that neighbor relation information is available for retrieval from the access terminal; and sending a second message to the access terminal as a result of receiving the first message, wherein the second message requests the neighbor relation information from the access terminal.

The disclosure relates in some aspects to reporting neighbor relation information in a manner that mitigates the impact this reporting has on access terminal power consumption (and, hence, standby time) and on other functionality of the access terminal. For example, an access terminal may report neighbor relation information during one or more radio states (e.g., CELL_DCH state or CELL_FACH state). Thus, one example of providing neighbor relation information may comprise: determining that an access terminal is in a defined radio state; and sending a message to report neighbor relation information as a result of the determination that the access terminal is in the defined radio state.

The disclosure relates in some aspects to a neighbor relation scheme where an access terminal determines when to report neighbor relation information. For example, an access terminal may elect to not immediately report measured neighbor relation information and instead store the information for reporting at a later time. Thus, a method of providing neighbor relation information may comprise, for example: acquiring neighbor relation information at an access terminal; determining that the neighbor relation information is not to be reported immediately to a network entity; and storing the neighbor relation information as a result of the determination that the neighbor relation information is not to be reported immediately.

The disclosure relates in some aspects to exchanging neighbor relation information over a direct interface between access points. For example, a neighbor relation information communication method may comprise: establishing a direct interface between a first access point and a second access point; receiving a neighbor relation report from an access terminal at the first access point; generating a neighbor relation message including neighbor relation information of the neighbor relation report; and sending the neighbor relation message to the second access point via the direct interface.

BRIEF DESCRIPTION OF THE DRAWINGS

These and other sample aspects of the disclosure will be described in the detailed description and the appended claims that follow, and in the accompanying drawings, wherein:

Figure 1:
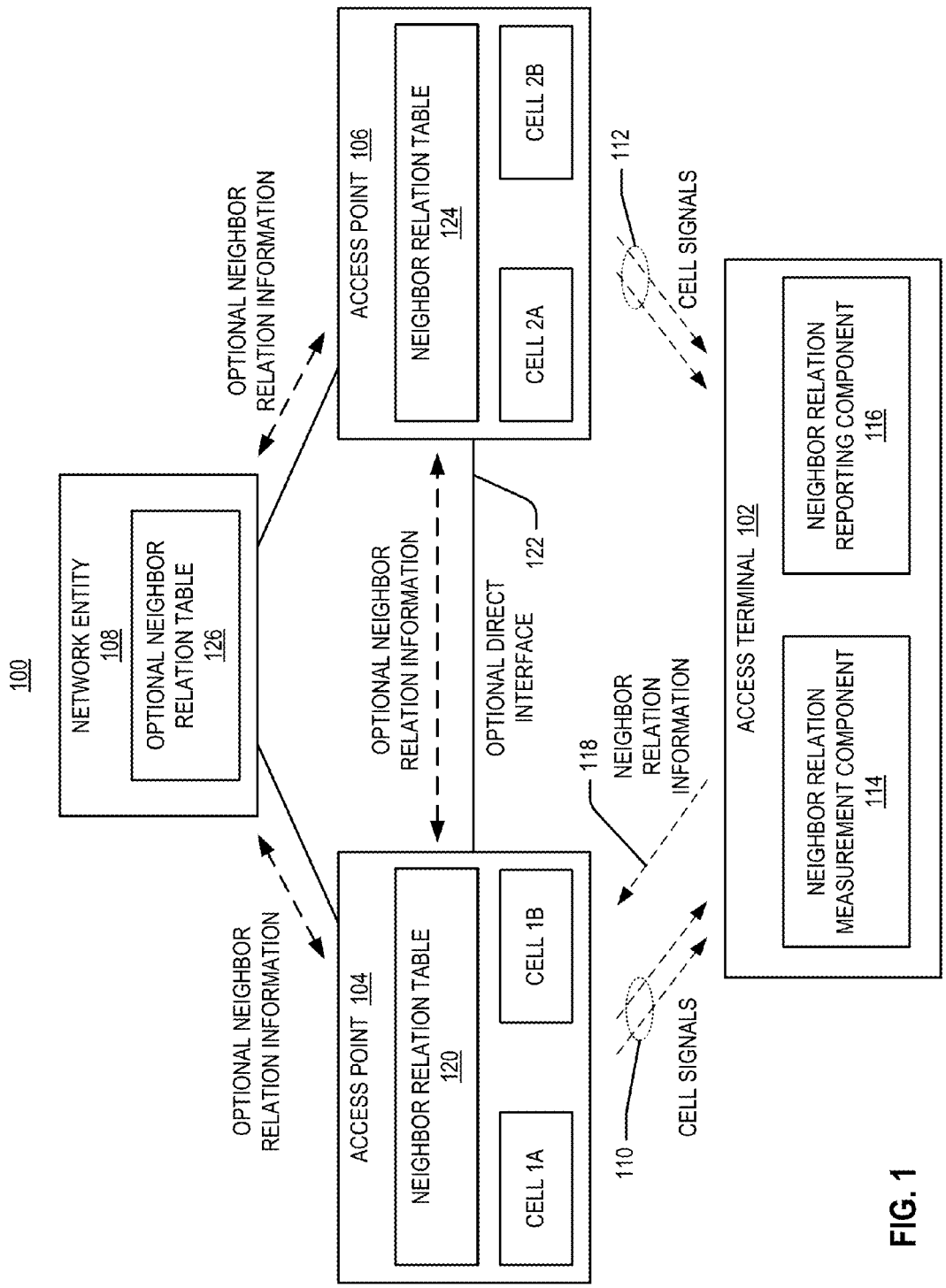
FIG. 1 is a simplified block diagram of several sample aspects of a communication system adapted for managing neighbor relation information.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as radio access networks (RANs), radio network controllers (RNCs), base stations, NodeBs, NodeB+s, eNodeBs, base station controllers (BSCs), base station transceivers (BSTs), and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to an access point 104, an access point 106, or some access point in the system 100 (not shown). Each of these access points may communicate with one or more other network entities (represented, for convenience, by a network entity 108) to facilitate wide area network connectivity.

These other network entities may take various forms such as, for example, one or more radio network entities (i.e., entities that provide radio connectivity to the network) and/or core network entities (i.e., entities that provide network resource management and/or provisioning). Thus, in some implementations the network entities may represent functionality such as one or more of: network management (e.g., via an operations, administration, and management (OAM) entity, a global OAM entity, a minimization of drive tests (MDT) server, etc.), call control, session management, mobility management, gateway functions, interworking functions, or some other suitable network functionality. At a minimum, the OAM entities (and global OAM entities, if applicable) are responsible for configuration of an access points in the network. In some aspects, mobility management relates to: keeping track of the current location of access terminals through the use of tracking areas, location areas, routing areas, or some other suitable technique; controlling paging for access terminals; and providing access control for access terminals. Two of more of these network entities may be co-located and/or two or more of these network entities may be distributed throughout a network.

In the example of FIG. 1, the access point 104 includes a pair of cells 1A and 1B while the access point 106 includes a pair of cells 2A and 2B. Each of these cells broadcasts signals (represented by the dashed lines 110 and 112) that provide information about that cell. For example, a cell may broadcast reference signals (e.g., pilot signals) that indicate the primary scrambling code (PSC) used by that cell. In addition, a cell may broadcast messages (e.g., including system information) that include one or more identifiers of the cell and other information about the cell.

In accordance with the teachings herein, access terminals are configured to receive signals from nearby cells to acquire neighbor relation information and provide this neighbor relation information to associated access points. In this way, the access points may acquire information about their neighbor access points. In the example of FIG. 1, a neighbor relation measurement component 114 of the access terminal 102 processes signals transmitted by the cells 1A, 1B, 2A, and 2B (and any other nearby cells, not shown) to acquire neighbor relation information. A neighbor relation reporting component 116 of the access terminal 102 sends the acquired neighbor relation information to the access point 104 as represented by the dashed line 118. The access point 104 is thus able to autonomously update its neighbor relation table 120 based on this information.

These measurement and reporting operations may employ one or more of the techniques taught herein to provide more efficient and accurate neighbor relation information for the entities of the system 100. For example, measurements may be performed in a manner (e.g., under certain conditions) to mitigate impact on other functions of the access terminal 102. As another example, reporting may be performed in a manner (e.g., under certain conditions) that mitigates the impact this reporting has on the power consumption of the access terminal 102. Also, the access terminal 102 may use a signal threshold to ensure the reliability of measurements for neighbor relation information. In some implementations, the access terminal 102 decides whether to conduct a measurement and/or how (e.g., when) to report neighbor relation information. For example, the access terminal 102 may not immediately report its acquired neighbor relation information. Also, an indication may be employed to enable the access terminal 102 and the access point 104 to efficiently determine when to commence a neighbor relation information exchange.

Also in accordance with the teachings herein, neighbor relation information may be sent directly from one network entity to another to facilitate more efficient ANR. For example, the access point 104 and the access point 106 may establish a direct interface 122 and then exchange neighbor relation information over the direct interface 122. Thus, the access point 104 may send neighbor relation information from its neighbor relation table 120 (e.g., the neighbor relation information received from the access terminal 102) to the access point 106 so that the access point 106 may update its neighbor relation table 124 accordingly. Conversely, the access point 106 may send neighbor relation information from its neighbor relation table 124 to the access point 104 so that the access point 104 may update its neighbor relation table 120 accordingly. Here, the term interface refers to a logical communication channel that is established between entities to enable the entities to communicate. In addition, the term direct interface refers to an interface that is terminated by the endpoint entities and not by any intervening entities.

The access points 104 and 106 may exchange neighbor relation information with other network entities in the system 100. For example, the access points 104 and 106 may send neighbor relation information from their respective neighbor relation tables 120 and 124 to the network entity 108 so that the network entity 108 may update its neighbor relation table 126 accordingly. Conversely, the network entity 108 may send neighbor relation information from its neighbor relation table 126 to the access points 104 and 106 so that these access points may update their respective neighbor relation tables 120 and 124 accordingly.

In view of the above, it may be seen that the neighbor relation information maintained by a given network entity may be acquired by that network entity in various ways. A network entity may receive neighbor relation information from an access terminal, from another network entity, or the network entity may acquire neighbor relation information on its own. As an example of the latter case, a network entity may incorporate radio technology that is capable of acquiring signals transmitted by cells (e.g., an access point may include a network listen module).

As discussed in more detail below in conjunction with FIGS. 11 and 12, a network entity may exchange neighbor relation information with many different types of network entities. For example, a network entity (e.g., a radio network entity or a core network entity) may exchange neighbor relation information with an access point, an OAM, a global OAM, an MDT server, a core network entity, and so on, via corresponding interfaces. In some cases, the neighbor relation information is sent to a destination network entity via another network entity (e.g., an OAM or core network entity). Thus, the neighbor relation information may be sent via multiple interfaces. In some cases, neighbor relation information is sent to a destination network entity associated with a different radio access technology (e.g., an inter-RAT exchange of neighbor information).

Through the use of these interfaces, the entities may autonomously exchange neighbor relation information (e.g., without human or operator action). Thus, the entities in a network may employ the teachings herein to implement ANR functionality that efficiently maintains accurate neighbor relation information at each entity.

Neighbor relation information may take a variety of forms depending on the types of information that are available in a given implementation. For example, neighbor relation information may comprise one or more of: identity of neighboring cells, e.g., cell identity in UMTS (UTRAN), cell global identifier (CGI) in LTE or GSM, closed subscriber group (CSG) in LTE; access rights information, e.g., CSG information; path loss information; received signal quality indication, e.g., common pilot channel (CPICH) chip energy-to-interference density ratio (Ec/Io), signal-to-noise ratio (SNR), etc.; broadcast power information; list of neighbors of the cell whose broadcast information is acquired; cell loading information, in terms of throughput and/or number of connections, relative or absolute; amount, number, or proportion of calls/UEs dropped or in poor conditions due to coverage problems; amount, number, or proportion of calls/UEs handed out undesirably, e.g., to macro network from femto cell; or amount of ping-ponging observed.

Sample neighbor relation operations will now be described in more detail in conjunction with the flowcharts of FIGS. 2-10. For convenience, the operations of FIGS. 2-10 (or any other operations discussed or taught herein) may be described as being performed by specific components (e.g., the components of FIG. 1, FIG. 11, FIG. 12, FIG. 13, and so on). It should be appreciated, however, that these operations may be performed by other types of components and may be performed using a different number of components. It also should be appreciated that one or more of the operations described herein may not be employed in a given implementation.

Figure 2:
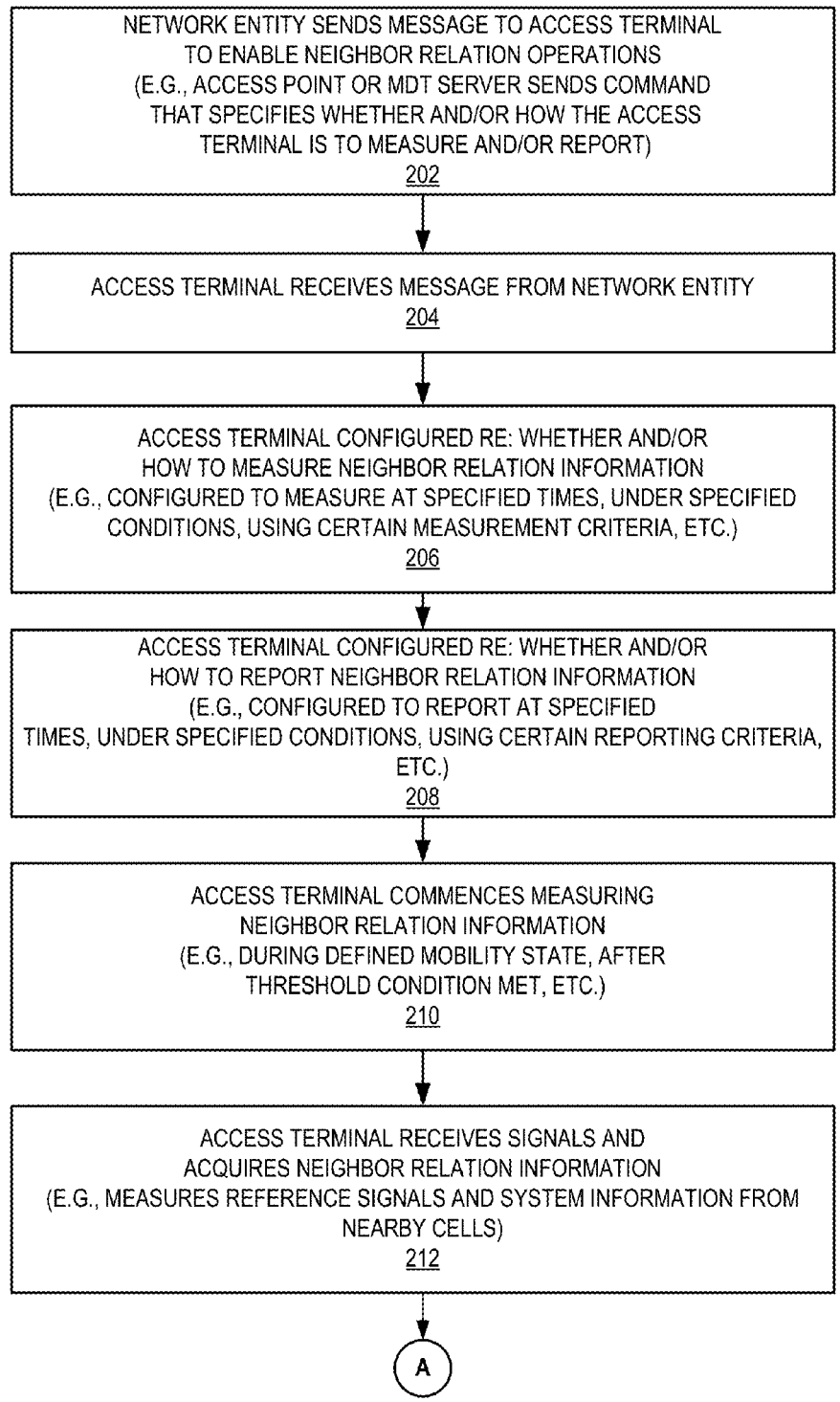
FIGS. 2 and 3 are a flowchart of several sample aspects of operations that may be performed to manage neighbor relation information.
Figure 3:
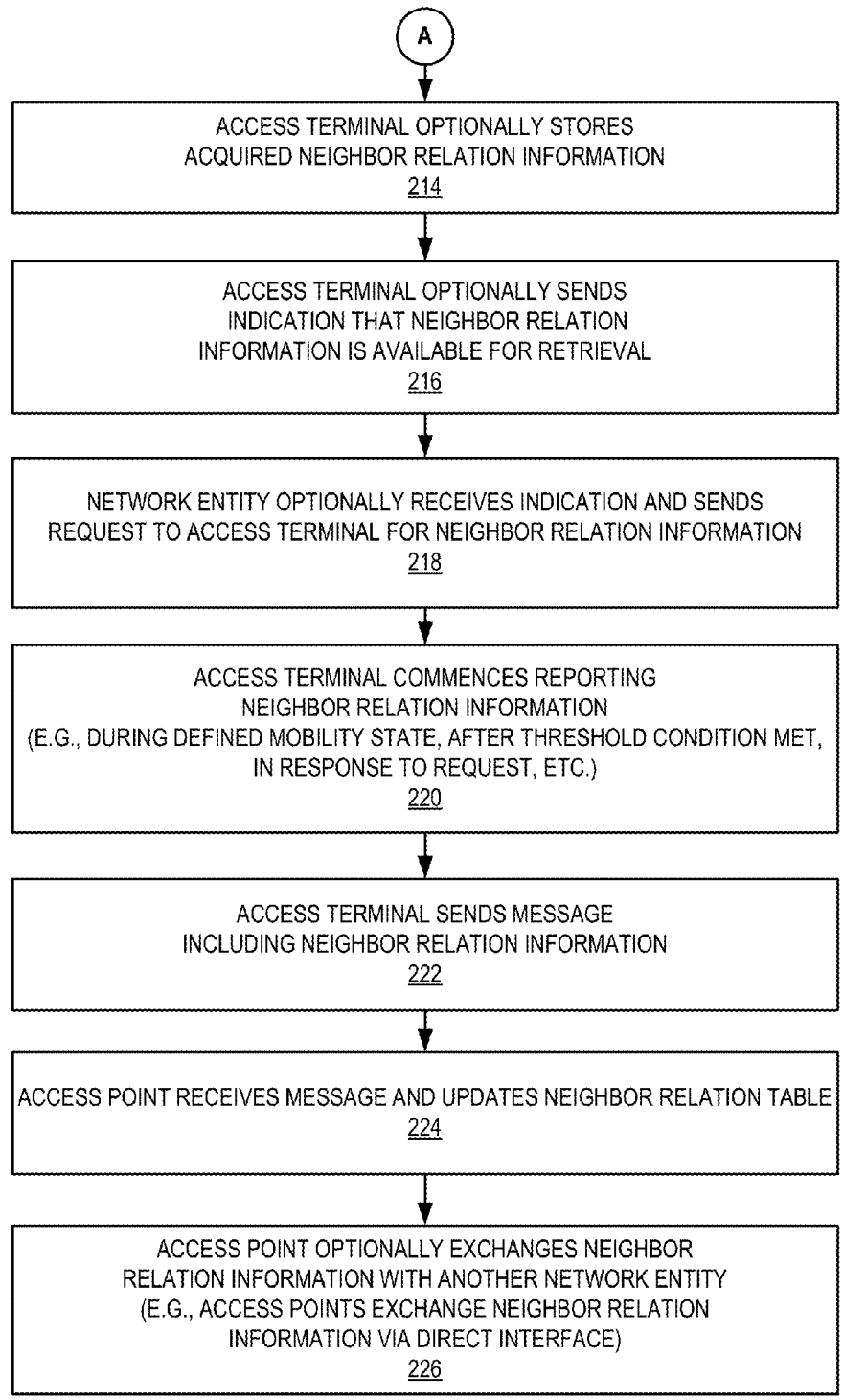

Referring initially to FIGS. 2 and 3, this flowchart describes several sample operations that may be performed in conjunction with an access terminal collecting neighbor relation information and reporting this information to an access point. In this example, it is assumed that the access terminal has established some form of association with the access point. For example, the access terminal may have registered with the access point, the access point may currently be serving the access terminal, and so on.

An access terminal may be configured to perform neighbor relation functions in various ways. For example, an access terminal may be configured by an associated management entity (e.g., an MDT server) to provide certain neighbor relation functionality. As another example, access terminal may be configured to provide certain neighbor relation functionality once that access terminal associates with (e.g., registers with) a given access point. In some implementations, upon deployment of the access terminal by a network operator, the access terminal may be configured to provide certain neighbor relation functionality. In this case, the access terminal may be further configured (e.g., to commence reporting) by another entity at a later point in time.

As represented by block 202 of FIG. 2, at some point in time a network entity sends a message to an access terminal to enable neighbor relation operations. For example, an MDT server or an access point may send a command to the access point to instruct the access point whether it may commence neighbor relation-related measurements and/or reporting. Such a message also may specify how the access terminal is to perform the neighbor relation-related measurements and/or reporting. For example, the message may include neighbor relation measurement and/or reporting criteria that specify the timing of measurement and/or reporting (e.g., by specifying times or time periods during which the access terminal is to measure and/or report). The message may include neighbor relation measurement criteria that specify a threshold to be used in conjunction with measurements. The message may include neighbor relation specific one or more parameters that the access terminal is to use in conjunction with measuring and/or reporting. The message may specify the type of information to be measured and/or reported. The message may include neighbor relation measurement and/or reporting criteria that specify information about potential cells to be monitored for neighbor relation information (e.g., identifiers, locations, area codes, CSGs, RAT types, and PLMN identities).

The message of block 202 may be sent in various ways. For example, an access point may transmit a unicast message directly to the access point or the access point may broadcast a message. As another example, an MDT server may send a message to the access terminal through the use of an open mobile alliance device management (OMA DM) protocol.

As represented by block 204, the access terminal receives the message sent at block 202 via its serving cell. Depending on how the access terminal is configured, the access may act on the received message immediately or at some other time.

As represented by block 206, based on the received message (and optionally other configuration operations), the access terminal is configured with respect to: whether the access terminal is to conduct a measurement for neighbor relation information and/or how (e.g., when) the access terminal is to conduct a measurement for neighbor relation information. For example, the access terminal may determine whether and/or how (e.g., when) to conduct a measurement based on neighbor relation measurement criteria included in the received message. In some cases, the access terminal is configured to measure at specified times. In some cases, the access terminal is configured to measure under specified conditions. For example, the access terminal may be configured to measure only when it is operating in a specified radio state (or in any of a set of specified radio states). In some cases, the access terminal is configured to use certain measurement criteria (e.g., a threshold) when conducting a measurement. In some cases, the access terminal checks its current operating environment to determine whether to conduct a measurement. For example, the access terminal may determine whether measurement opportunities have been configured for the access terminal, whether the access terminal has sufficient resources (e.g., antennas and receive chains) available for measurements, or whether measurements may be conducted in a manner such that incremental power consumption may be reduced. In some cases, a measurement for neighbor relation information may be conditionally allowed (e.g., subject to other conditions) if the access terminal determines that a nearby cell is reporting one or more of: an identifier, an area code, a CSG, a RAT type, or a PLMN type specified by neighbor relation measurement criteria.

As represented by block 208, based on the received message (and optionally other configuration operations), the access terminal is configured with respect to: whether the access terminal is to report neighbor relation information and/or how the access terminal is to report neighbor relation information. For example, the access terminal may determine whether and/or how to report based on neighbor relation measurement criteria included in the received message. In some cases, the access terminal is configured to report at specified times. In some cases, the access terminal is configured to report under specified conditions. For example, the access terminal may be configured to report only when it is operating in a specified radio state (or in any of a set of specified radio states). In some cases, the access terminal is configured to use certain reporting criteria (e.g., an indication is to be sent if neighbor relation information is available for retrieval).

As represented by block 210, at some point in time (e.g., based on the configuration of block 206), the access terminal commences measuring for neighbor relation information. As discussed below in conjunction with FIG. 4, in some implementations, the measurements are commenced if the access terminal is in a defined radio state. As discussed below in conjunction with FIG. 5, in some implementations, the measurements are commenced if certain signals received by the access terminal are greater than or equal to a neighbor relation-specific threshold.

As represented by block 212, the access terminal uses its receiver(s) to receive signals from nearby cells. Here, the access terminal may conduct intra-frequency measurements, inter-frequency measurements, or inter-RAT measurements in an attempt to acquire signals from any cells in the area.

As mentioned above, the access terminal may measure different types of signals in different implementations. In a typical scenario, the access terminal attempt to detect reference signals (e.g., pilot signals) and system information transmitted by cells. In addition, the access terminal may derive (e.g., extract) various types of information from the received signals (e.g., as specified by the configuration of block 206).

As represented by block 214 of FIG. 3, the access terminal may elect to store the acquired neighbor relation information in some cases. For example, the access terminal will store this information in cases where the access terminal does not immediately report the acquired neighbor relation information.

As represented by block 216, in some implementations, the access terminal sends an indication that it has neighbor relation information available for retrieval. This information may be sent, for example, to an entity that requested the access terminal to report neighbor relation information (e.g., at block 202). These operations are described in more detail below in conjunction with FIG. 7.

As represented by block 218, in implementations where the access terminal sends an indication at block 216, a network entity that receives the indication may subsequently send a request to the access terminal for the neighbor relation information. These operations are described in more detail below in conjunction with FIG. 8.

As represented by block 220, at some point in time, the access terminal commences reporting neighbor relation information. This reporting may be triggered by receipt of the request described at block 218 and/or based on the configuration of block 208. As an example of the latter case, in some implementations, the reporting is commenced if the access terminal is in a defined radio state as discussed in more detail below in conjunction with FIG. 9.

As represented by block 222, the access terminal uses its transmitter to send a one or more messages including the neighbor relation information. Such a message may be sent to the entity that requested a neighbor information report and, optionally, to some other entity. Typically, the access terminal will send its neighbor relation information to an associated access point to enable that access point to learn about its neighbors.

Here, the access terminal may identify neighbor relation information corresponding to a specific access point by identifying the neighbor relation information that the access terminal was able to reliably acquire from nearby cells while the access terminal was within the coverage of that specific access point. Here, a determination as to whether the access terminal is able to reliably acquire information from a nearby cell and/or whether the access terminal is within the coverage of the access point may be based on specified signal acquisition criteria (e.g., minimum received signal strength and/or signal decoding error rate). Thus, in other words, measurement of neighbor relation information may comprise processing signals transmitted by at least one cell that the access terminal is able to receive while the access terminal is within coverage of a serving cell.

The access point receives the neighbor relation message from the access terminal as represented by block 224. Upon receipt of this information, the access point updates its neighbor relation table.

As represented by block 226, the access point may exchange its neighbor relation information with another network entity (or other network entities). For example, as discussed in more detail below in conjunction with FIG. 10, the access point may exchange neighbor relation information with another access point via a direct interface (e.g., a UTRAN Iur interface or an E-UTRAN X2 interface).

Figure 4:
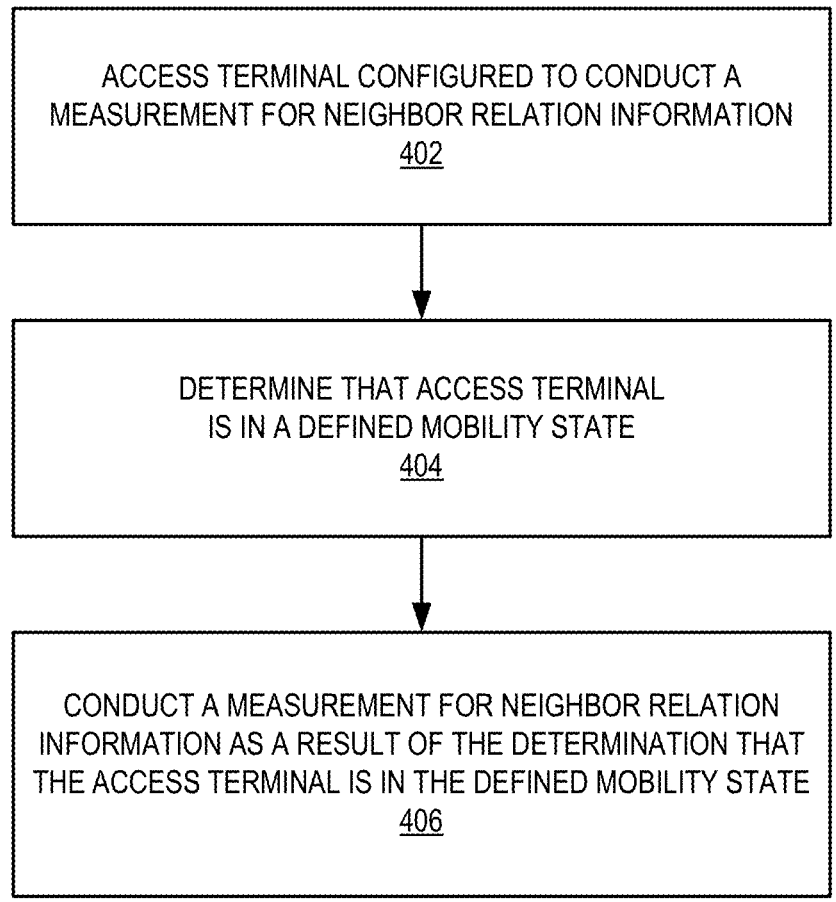
FIG. 4 is a flowchart of several sample aspects of operations that may be performed in conjunction with conducting a measurement for neighbor relation information.

FIG. 4 illustrates sample operations that may be performed in conjunction with conducting a measurement for neighbor relation information. Advantageously, the techniques of FIG. 4 enable an access terminal to conduct neighbor relation measurements without impacting other functions of the access terminal (e.g., other higher priority measurements, traffic, or functions), while at the same time mitigating impact on power consumption due to these measurements. Thus, these operations or other similar operations may be employed in situations where an access terminal (e.g., a UE) is only required to make a "best effort" for ANR operations. For example, the access terminal may use the techniques of FIG. 4 to read the system information blocks (to acquire Layer 2 information) of a target detected cell in a manner that does not impact access terminal paging or mobility behavior. Accordingly, in some aspects, a defined radio state may comprise a state during which the measurement for neighbor relation information will not impede at least one specified operation of the access terminal (e.g., a measurement other than a neighbor relation measurement or an operation where the access terminal sends traffic or receives traffic).

As represented by block 402, the access terminal is configured to conduct neighbor relation measurements (e.g., as discussed herein). As represented by block 404, at some point in time after the access terminal is configured to conduct neighbor relation measurements, the access terminal determines that it is in a radio state that has been defined as one in which such measurements may be made. For example, in a UMTS implementation, an access terminal may be configured to only conduct measurements for neighbor relation information when the access terminal is in any one of a set of UMTS radio states (i.e., radio resource control states) that includes one or more of: IDLE state, CELL_PCH state, CELL_PCH state with DRX gaps, URA_PCH state, or CELL_FACH state.

As represented by block 406, as a result of the determination of block 404, the access terminal conducts one or more measurements for neighbor relation information. Thus, based on the signals received from a given cell, the access terminal may acquire, for example, one or more of: a cell identifier, a CGI, a PLMN identifier, a tracking area code (TAC), a location area code (LAC), a routing area code (RAC), reference signal information (e.g., an identifier associated with a pilot signal), a signal quality measure (e.g., Ec/Io, RSCP), or other information. The access terminal may continue making measurements until it receives an indication that the access terminal is no longer in the defined radio state, unless the measurements are terminated earlier for some other reason (e.g., some other condition is no longer met or the measurements are complete).

Figure 5:
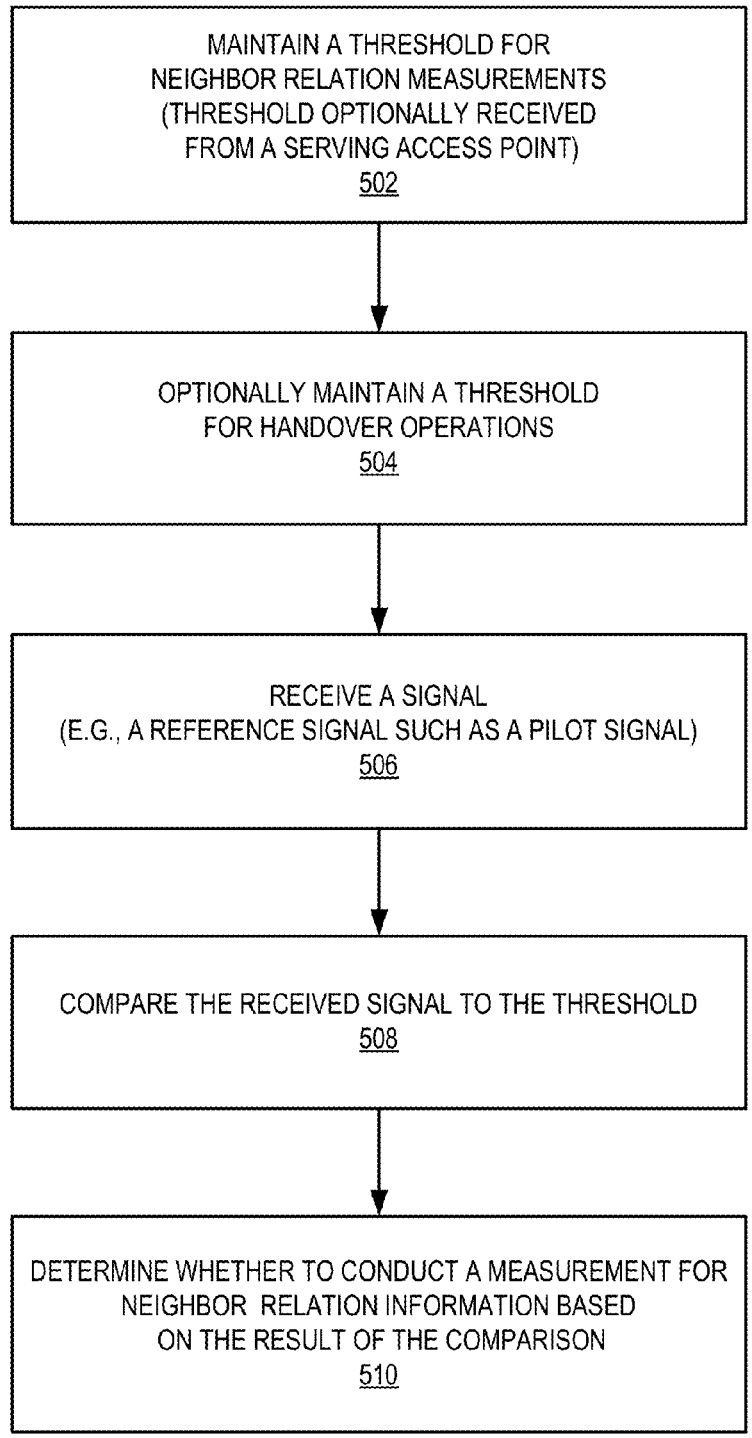
FIG. 5 is a flowchart of several sample aspects of operations that may be performed in conjunction with determining whether to conduct a measurement for neighbor relation information.

FIG. 5 illustrates sample operations that may be performed in conjunction with using a threshold to conduct a measurement for neighbor relation information. For example, an access terminal (e.g., a UE) may be allowed to log detected cells if a neighbor relation logging threshold is satisfied (and if other conditions are met, if applicable).

As represented by block 502, an access terminal maintains at least one threshold for neighbor relation measurements. In some cases, the access terminal is configured with the threshold. For example, a network entity (e.g., an access point or MDT server) may send the threshold information to the access terminal. In some cases, the threshold is an internal access terminal threshold.

As represented by block 504, in some cases, an access terminal maintains a different threshold for handover measurements. Here, it should be appreciated that a threshold for handover-related measurements may be similar to a threshold for neighbor relation-related measurements (e.g., both thresholds may correspond to the same type of measurement). Indeed, in some cases, the threshold value may be the same whereby a single threshold could be used for both operations. Typically, however, these operations will employ thresholds with different values and the thresholds may correspond to different measures of signal quality or strength (e.g., Ec/Io versus some other measure of signal quality).

As represented by block 506, at some point in time, the access terminal receives a signal from at least one nearby cell. For example, the access terminal may receive a reference signal from a cell or the access terminal may receive a signal that carries the system information for the cell. As represented by block 508, the access terminal compares this received signal to the threshold.

As represented by block 510, based on the comparison of block 508, the access terminal determines whether to conduct a measurement for neighbor relation information. For example, if the magnitude of the received signal is greater than or equal to the threshold, the access terminal may log system information received from the cell or cells that provided the signal of block 506.

Figure 6:
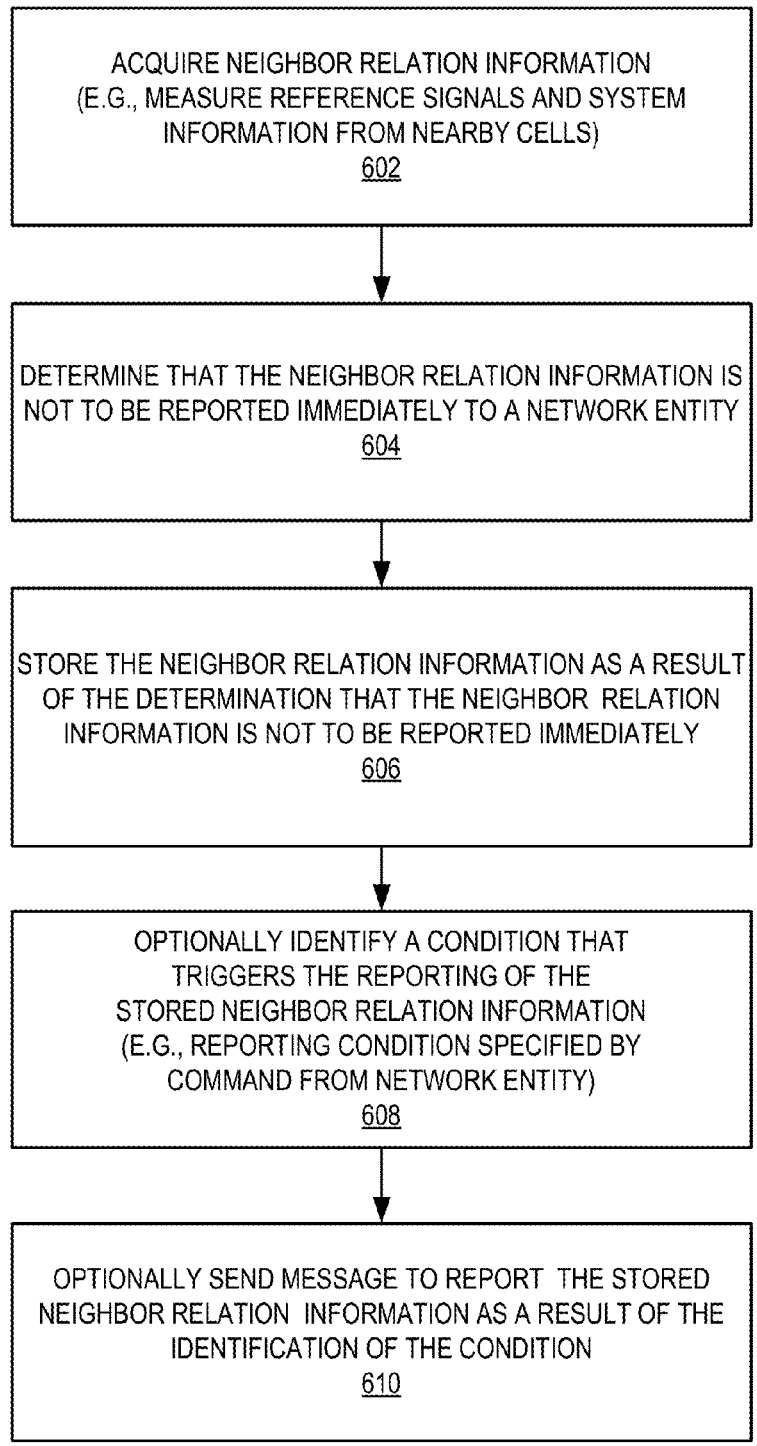
FIG. 6 is a flowchart of several sample aspects of operations that may be performed in a scheme where network relation information is not immediately reported.

FIG. 6 illustrates sample operations that may be performed in case where an access terminal does not immediately report acquired neighbor relation information. For example, an access terminal (e.g., a UE) may store any logs that have not been retrieved by a network entity (e.g., an MDT server or an access point).

As represented by block 602, at some point in time, the access terminal acquires neighbor relation information. For example, as discussed herein, the access terminal receives signals from nearby cells and extracts the appropriate neighbor information (e.g., identifiers, etc.) from those signals.

As represented by block 604, under certain conditions, the access terminal determines that the neighbor relation information is not to be reported immediately to a network entity. For example, the access terminal may delay reporting until a certain condition is met (e.g., as in FIG. 4) or the access terminal may maintain the information until the network entity requests the information (e.g., as in FIGS. 7 and 8).

As represented by block 606, the access terminal stores the neighbor relation information as a result of the determination of block 604. For example, the access terminal may maintain the information in a memory component (e.g., comprising a memory device such as RAM or FLASH memory) for retrieval at a later point in time.

As represented by block 608, the access terminal identifies a condition that triggers the reporting of the stored neighbor relation information. Such a reporting condition may be specified, for example, by a command received from a network entity (e.g., the MDT server or access point referenced above). As mentioned above, this trigger may correspond to a specified condition (e.g., as in FIG. 4) or a request for the information (e.g., as in FIGS. 7 and 8). As represented by block 610, upon identifying the condition of block 608, the access terminal sends a message to report the stored neighbor relation information (e.g., to the MDT server or access point). In some cases, this message indicates at least one time at which the access terminal acquired the neighbor relation information. In some cases, the message indicates that a portion of the neighbor relation information is not valid.

Figure 7:
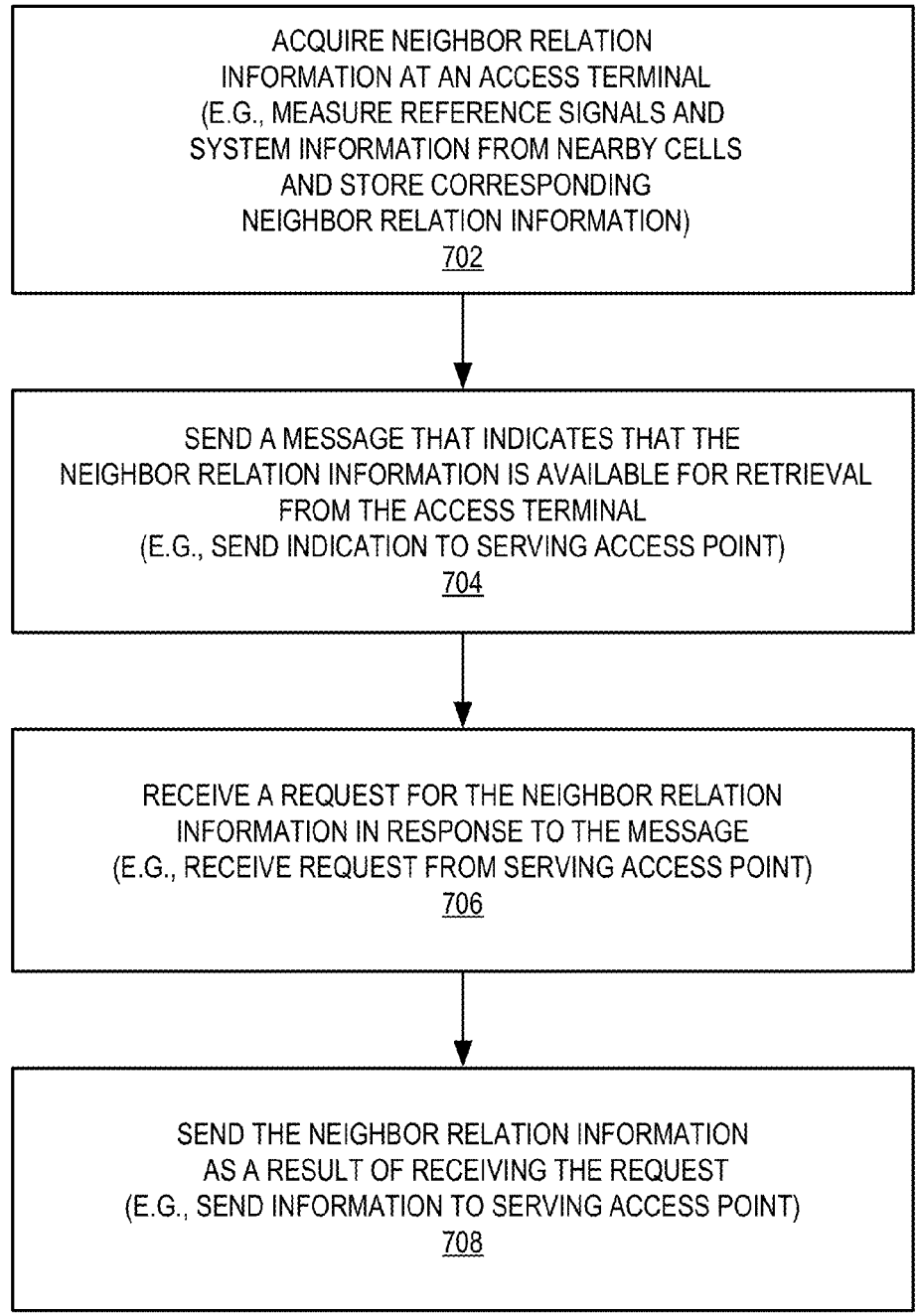
FIG. 7 is a flowchart of several sample aspects of operations that may be performed in conjunction with providing an indication that neighbor relation information is available for retrieval.
Figure 8:
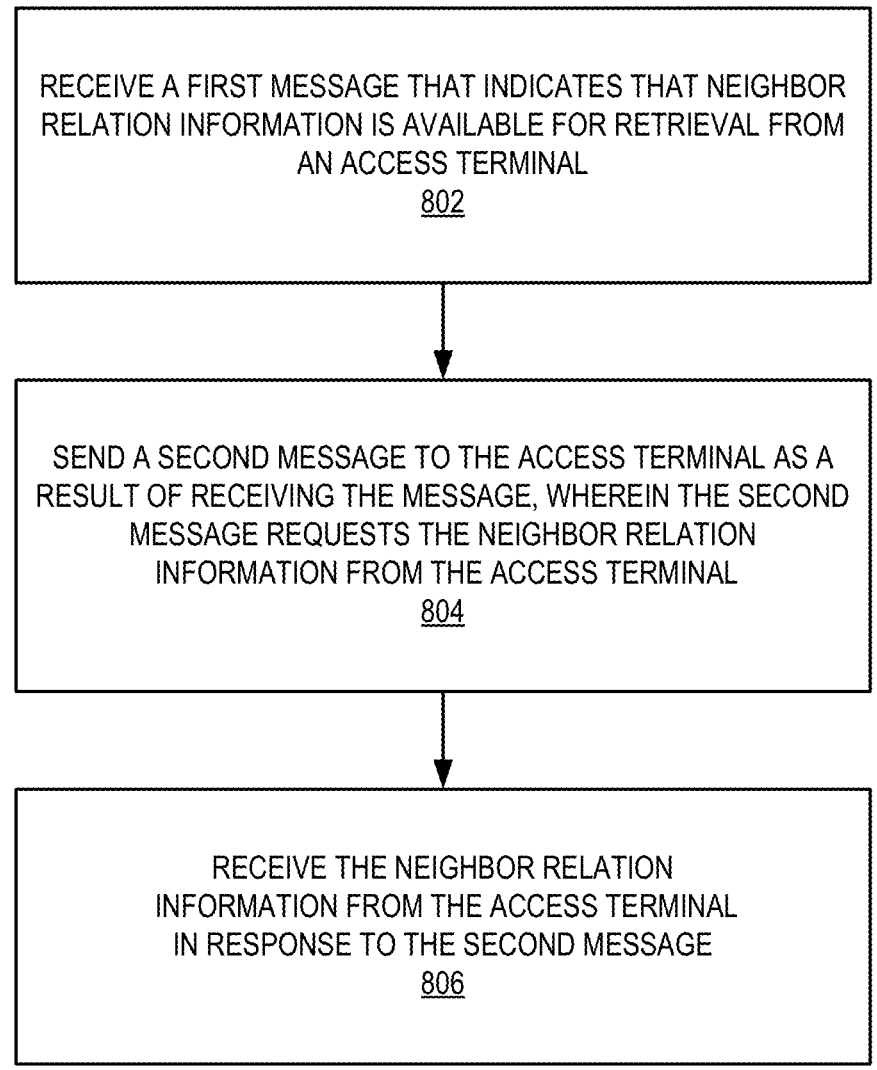
FIG. 8 is a flowchart of several sample aspects of operations that may be performed in conjunction with requesting neighbor relation information in response to receiving an indication that the neighbor relation information is available for retrieval.

FIGS. 7 and 8 illustrate sample operations that may be performed in an implementation where an access terminal provides an indication that it has neighbor relation information available for retrieval. For example, an access terminal (e.g., a UE) may indicate the availability of a neighbor relation log by including a one bit indicator in a message sent by the access terminal (e.g., RRC_CONNECTION_COMPLETE, CELL UPDATE, URA UPDATE, URA UPDATE, or MEASUREMENT REPORT). The network (e.g., an MDT server or access point) may then determine whether to retrieve to neighbor relation log based on this indicator (e.g., when the UE is in the CELL_DCH state or the CELL_FACH state).

FIG. 7 describes sample operations that may be performed at an access terminal. As represented by block 702, the access terminal acquires neighbor relation information and stores the information as discussed herein.

As represented by block 702, the access terminal sends a message that indicates that the neighbor relation information is available for retrieval. For example, the access terminal may send an explicit indication of this condition to its serving access point. The message of block 704 may comprise a dedicated message (i.e., a message that is only used for sending the indication) or a non-dedicated message (i.e., a message that is used for sending other information as well as the indication). The message may take various forms such, for example, a radio resource control (RRC) message.

In some cases, the access terminal may determine that not all of the acquired neighbor relation information can be sent in a single report message. Consequently, the access terminal may send another message that indicates that additional neighbor relation information is available for retrieval. This other message may be a message dedicated for this purpose or another type of message (e.g., another RRC message) that includes an explicit indication that additional neighbor relation information is available for retrieval.

As represented by block 706, the access terminal receives a request for the neighbor relation information in response to the message of block 704. For example, the access terminal may receive a message including the request from its serving access point. As represented by block 708, the access terminal sends the neighbor relation information (e.g., to the serving access point) as a result of receiving the request of block 706. Thus, the access terminal may report, for example, one or more of: a cell identifier, a CGI, a PLMN identifier, a tracking area code (TAC), a location area code (LAC), a routing area code (RAC), a signal quality measure, or other information.

FIG. 8 describes sample operations that may be performed at a network entity (e.g., an MDT server or an access point). As represented by block 802, the network entity receives a message that indicates that neighbor relation information is available for retrieval from an access terminal. As represented by block 804, as a result of receiving the message of block 802, the network entity sends a message (e.g., an RRC message) that requests the neighbor relation information. In some cases, this message may only request a portion of the neighbor relation information that is available for retrieval. As represented by block 806, the network entity receives the neighbor relation information in response to the message of block 804 (e.g., via an RRC message).

As mentioned above, in some cases, not all of the neighbor relation information acquired by the access terminal may be sent in a single report message. Consequently, the network entity may receive another message that indicates that additional neighbor relation information is available for retrieval. Consequently, the network entity may send another request for the additional neighbor relation information as a result of receiving this additional message.

Figure 9:
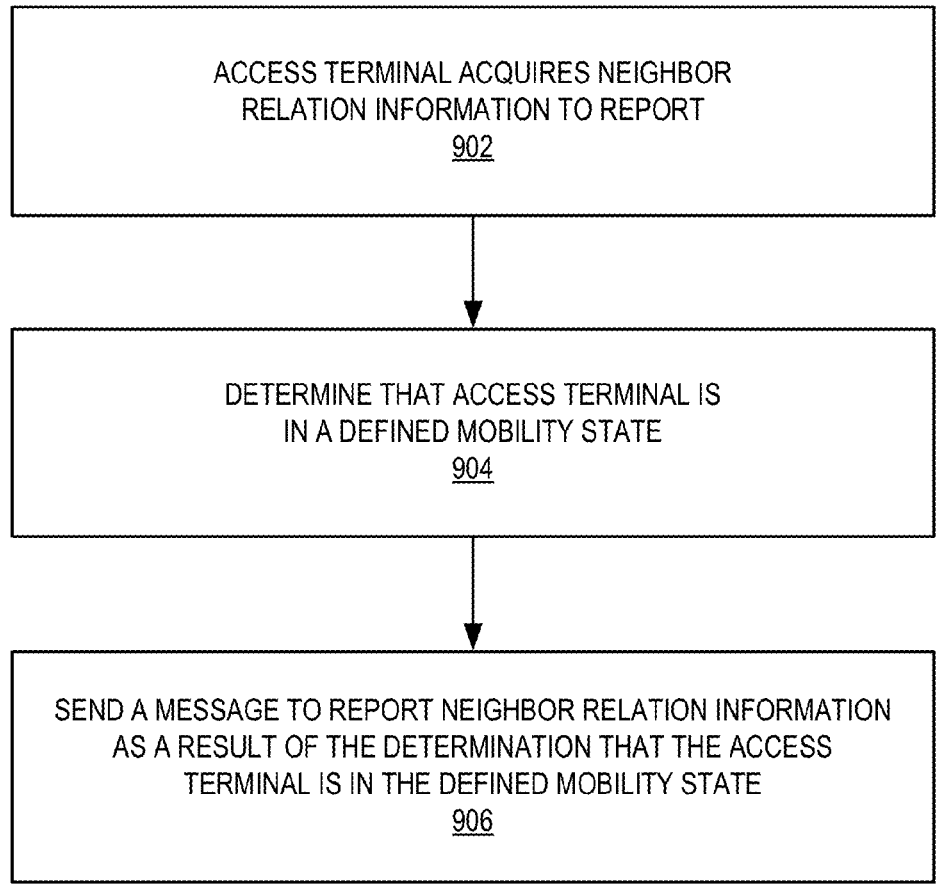
FIG. 9 is a flowchart of several sample aspects of operations that may be performed in conjunction with reporting neighbor relation information.

FIG. 9 illustrates sample operations that may be performed in conjunction with reporting neighbor relation information. Advantageously, the techniques of FIG. 9 enable an access terminal to send neighbor relation reports without impacting other functions of the access terminal (e.g., other higher priority reports, traffic, measurements, or functions), while at the same time mitigating impact on power consumption due to this reporting. Thus, these operations or other similar operations may be employed in situations where an access terminal (e.g., a UE) is only required to make a "best effort" for ANR operations. For example, the access terminal may use the techniques of FIG. 9 to report neighbor relation information in a manner that does not impact access terminal paging or mobility behavior.

As represented by block 902, the access terminal acquires neighbor relation information that is to be reported. As represented by block 904, as some point in time after the acquisition of neighbor relation information, the access terminal determines that it is in a defined radio state for which neighbor relation information reporting is allowed. For example, the access terminal may be allowed to report only during a radio state where the access terminal is configured to send other signals (e.g., signaling) on an uplink channel. As a specific example, in a UMTS implementation, an access terminal may be configured to report neighbor relation information when the access terminal is in a CELL_DCH state or a CELL_FACH state, but not when the access terminal is in an IDLE state, a CELL_PCH state, or a URA_PCH state. Advantageously, the transmission of a neighbor relation report during such a state may result in only a small incremental increase in the power consumption of the access terminal since the access terminal's radio (e.g., transmitter) may already be turned on during CELL_DCH state or CELL_FACH state. In contrast, if the report was instead sent during an IDLE state, a CELL_PCH state, or a URA_PCH state, the reporting would result in higher power consumption associated with turning on the radio (e.g., transmitter).

As represented by block 906, as a result of the determination of block 904, the access terminal sends a message to report the neighbor relation information. In some implementations, the access terminal schedules the transmission of this message so that it does not occur at the same time as at least one other operation of the access terminal. Here, the access terminal may identify a time during which the reporting of the neighbor relation information will not impede at least one specified operation of the access terminal, and then schedule the sending of the message according to the identified time. The access terminal may continue the reporting operations until it receives an indication that the access terminal is no longer in the defined radio state, unless the reporting is terminated earlier for some other reason (e.g., some other condition is no longer met or the reporting is complete).

Figure 10:
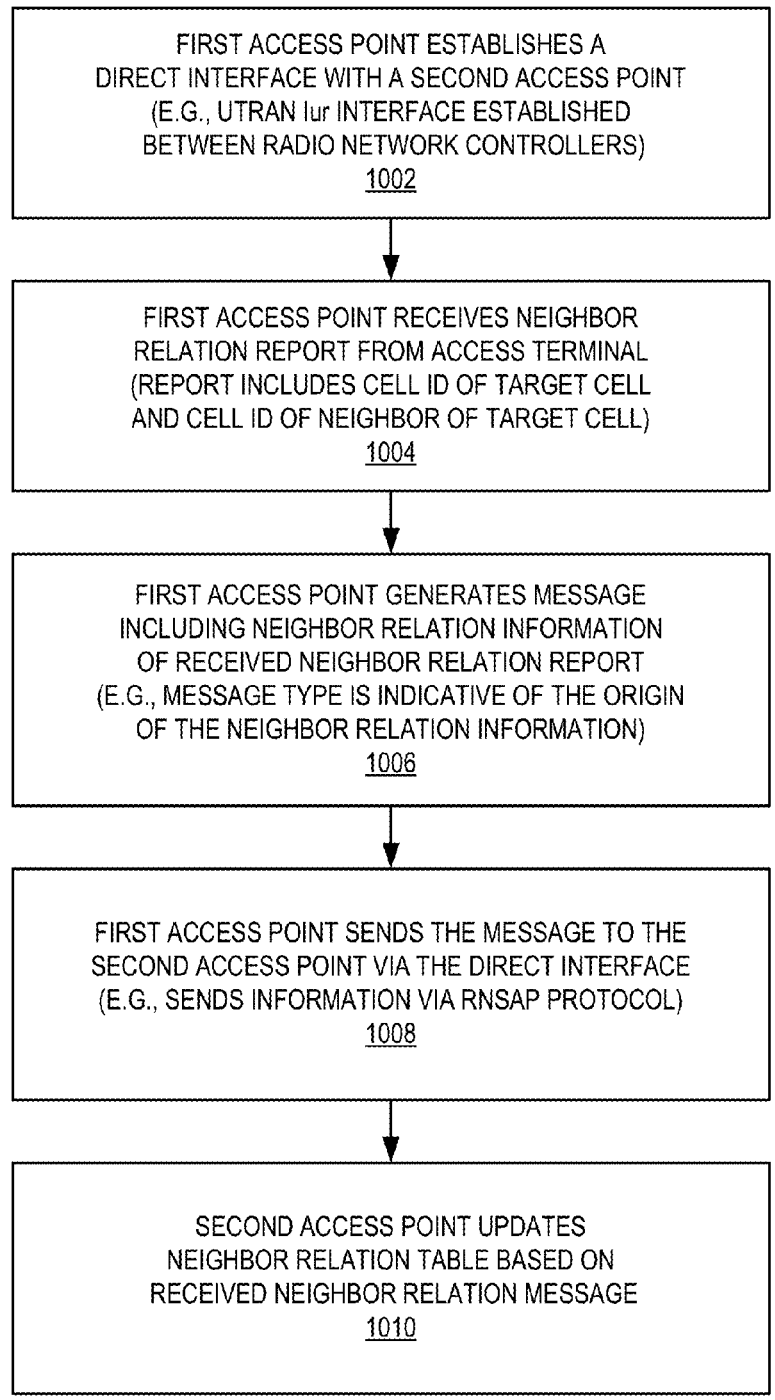
FIG. 10 is a flowchart of several sample aspects of operations that may be performed in conjunction with exchanging neighbor relation information.

FIG. 10 illustrates sample operations that may be performed in conjunction with exchanging neighbor relation information over a direct interface between two access points. As represented by block 1002, at some point in time, a first access point establishes a direct interface (e.g., a UTRAN Iur interface or an E-UTRAN X2 interface) with a second access point. For example, network technicians may configure the access points (e.g., by operation of corresponding controllers of the access points) to set up an Iur interface or an X2 interface. In some cases, access points may dynamically set up an X2 interface between them (it is unlikely that an Iur interface would be set up in this manner however).

As represented by block 1004, the first access point receives a neighbor relation report from an access terminal. This report will identify at least one cell as being a neighbor of a target cell. For example, the serving cell of the access terminal may be considered the target cell for which the access terminal is identifying potential neighbor cells. To this end, the neighbor relation report will include identification information for each target cell and each neighbor cell. This identification information will include, at a minimum, a cell identifier for each cell. This identification information also may include, for each identified cell, one or more of: a PSC, a TAC, a PLMN identifier, or some other neighbor relation information (e.g., as described herein). In some aspects, the neighbor relation report is considered to comprise ANR information since the information did not originate from an operator. In addition, due to the origin of the information, there may not be a high level of confidence that this information is accurate. For example, an access terminal may report a cell as being a neighbor of a target cell in situations where this relation would not recognized by the network (e.g., the reported neighbor cell is on a different network). Consequently, when the first access point exchanges neighbor relation information from the report with another entity, the first access point may provide an indication of the origin of the neighbor relation information so that the receiving entity may take this origin into account when updating its neighbor relation table.

As represented by block 1006, the first access point generates a message including neighbor relation information of the received report. In some cases, the first access point simply incorporates the received report into the message. In other cases, the first access point extracts neighbor relation information from the report and includes this extracted information into the message. Also, the first access point may generate the message such that the message is indicative of the origin of the neighbor relation information in the message. In some cases, the type of message generated at block 1006 may indicate that the neighbor relation information in the message is of access terminal origin. In some cases, the contents of the message (e.g., an indication included in the message) may indicate that the neighbor relation information in the message is of access terminal origin. In some cases, the message may explicitly indicate the origin of the neighbor relation information (e.g., the message includes an identifier of the access terminal).

As represented by block 1008, the first access point sends the neighbor relation message to the second access point via the direct interface. For example, the first access point may conduct an RNSAP direct information transfer to send an ANR report to the second access point. Consequently, the second access point (and potentially any other entities that subsequently acquire this neighbor relation information) may receive an indication of the origin of the neighbor relation information (e.g., indicating that the information is not from a completely trustworthy source).

As represented by block 1010, the second access point updates its neighbor relation table based on the neighbor relation message received at block 1008. Given the origin of the neighbor relation information in the message, however, the second access point may take other information into account when using the neighbor relation information in the message. For example, the second access point may use this report and additional neighbor reports (that have also reported neighbors of the target cell) to determine whether the reported neighbor cell is indeed a neighbor of the target cell.

For purposes of explanation, additional details relating to neighbor relation management as taught herein will be described in the context of FIGS. 11 and 12. Briefly, FIG. 11 illustrates an example of how neighbor relation information may be exchanged between network entities such as RANs, OAM entities, and an MDT server, while FIG. 12 illustrates an example of how neighbor relation information may be exchanged between network entities such as RANs, core network (CN) entities, and an MDT server. It should be understood, however, that all of the entities of FIGS. 11 and 12 may be employed in a given network.

Figure 11:
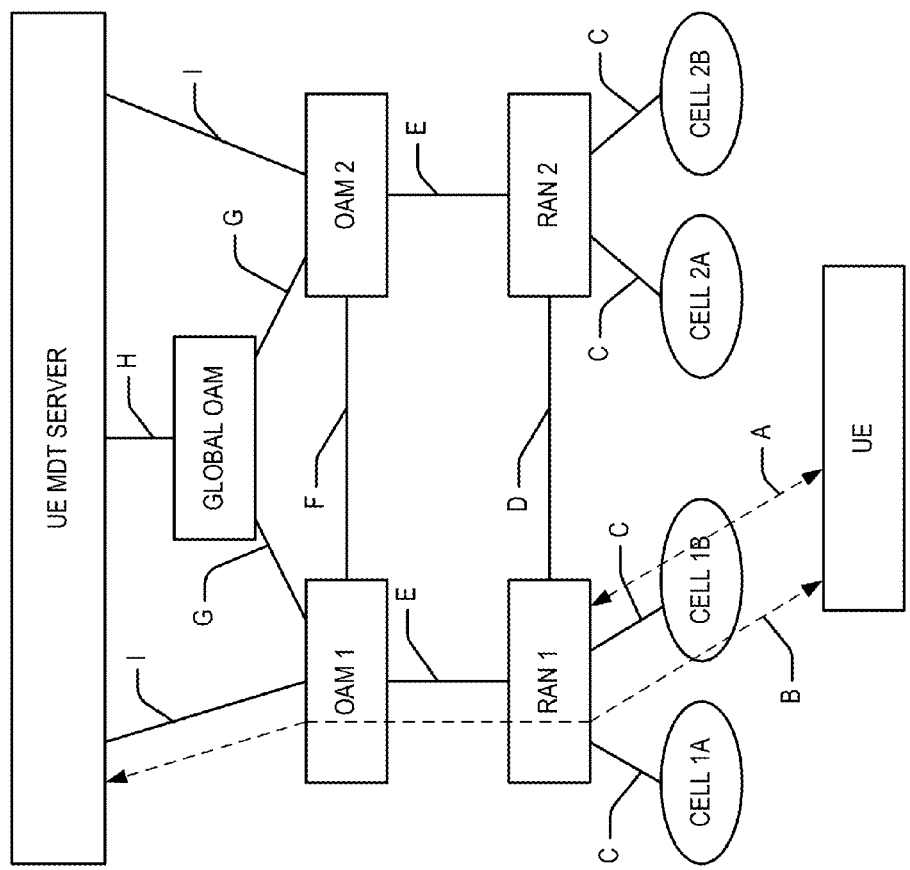
FIG. 11 is a simplified block diagram illustrating several examples of how neighbor relation information may be exchanged in a network.

FIG. 11 illustrates an example of an automatic network reconfiguration architecture which uses Operations, Administration, and Management (OAM) functions for system management. In one example, a UE Minimization of Drive Tests (MDT) Server appears at the top of the hierarchy and sends messages to various entities. Next, a Global OAM function, in one example, is used for overall system management and exchanges messages with individual OAM functions for specific Radio Access Network (RAN) management. In one example, each RAN supervises the radio access of multiple cells in the wireless system. In general, each RAN serves as an access point for a plurality of cells, which in turn connect to a plurality of UEs.

Figure 12:
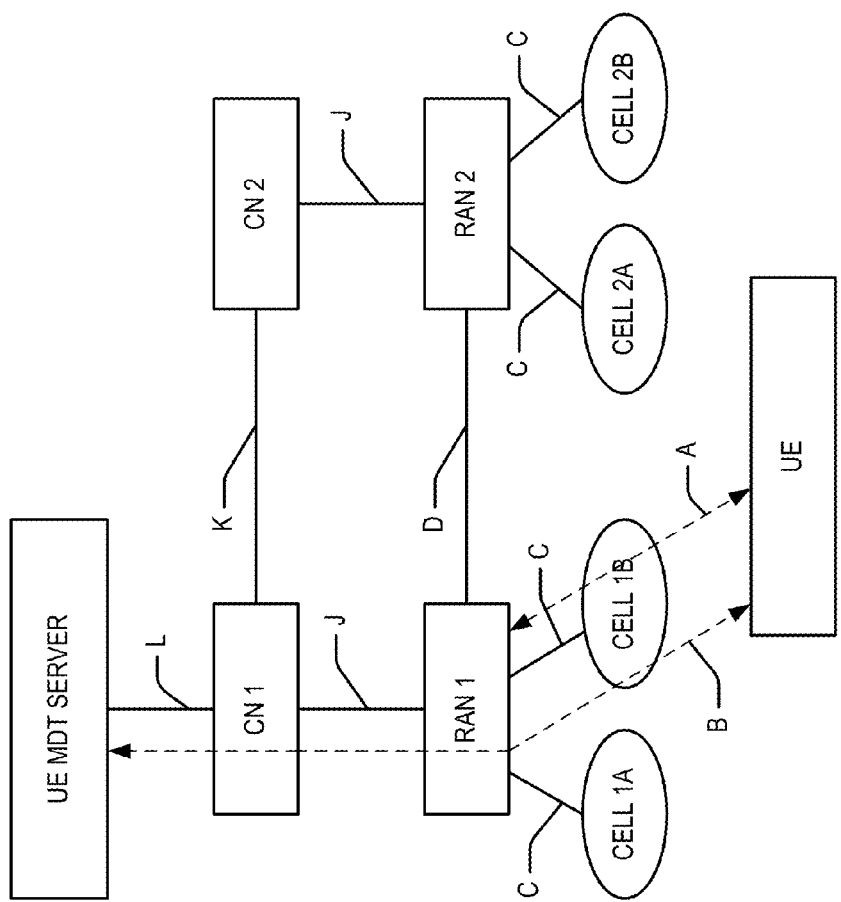
FIG. 12 is a simplified block diagram illustrating several examples of how neighbor relation information may be exchanged in a network.

FIG. 12 illustrates an example of an automatic network reconfiguration architecture which uses CN functions for system management. In one aspect, a UE MDT Server appears at the top of the hierarchy and receives messages from the CN. In one example, a plurality of CNs exchange messages with each other and with a plurality of RANs. In general, each RAN serves as an access point for a plurality of cells, which in turn connect to a plurality of UEs.

The interconnect lines in FIGS. 11 and 12 generically represent interfaces that may be employed between the various entities. For example, in FIG. 11, the interface A may comprise an RRC interface, the interface B may comprise and OMA-DM interface, the interface C may comprise an Iub interface, the interface D may comprise an Iur or X2 interface, the interface E may comprise an Itf-S interface, and the interface G may comprise an Itf-N interface. In FIG. 12, the interface J may comprise an Iu or S1 interface, and the interface K may comprise an S3 or Gn interface.

In FIGS. 11 and 12, individual nodes may be part of different radio access technology (RAT) architectures without affecting the scope or spirit of the present disclosure. With regards to FIGS. 11 and 12, one skilled in the art would understand that the interface names shown are only examples and should not be construed as restrictive, exclusive or comprehensive. Some of the interface names may be substituted while other interface names may be added without affecting the scope or spirit of the present disclosure.

In one aspect, a UE has several functions in this architecture. For example, the UE receives commands or detects pilots or reads layer 2 broadcasts from either specific cells or any detected cells. In one example, specific cells may be identified via ranges of pilot identities (e.g., primary synchronization code (PSC), physical cell identity (PCI)) or via their layer 2 identities (e.g., Cell Identity, global cell identity (GCI)). Such commands may be configured via interfaces A or B. In one example, commands via interface A can be unicast (e.g., RRC Measurement Configuration message) or acquired by the UE from cell broadcast (e.g., RRC System Information). In one aspect, commands via interface A may have to be obeyed by the UE either immediately or after a reasonable delay; or upon occurrence of some event (e.g., UE connects to RAN, UE performs some other report); or at UE's leisure (e.g., when other measurement or traffic activities are not impeded); or periodically (or at or after set times).

In another example, the UE measures the required quantities. For example, timing measurements may be taken by the UE at various occasions such as immediately, shortly before being required to report, at any opportunity in between, or never. If the UE can choose when to perform measurements, the UE may do so by considering: whether and when measurements can be performed without impacting other higher priority measurements, traffic or functions; whether and when the signal received from the cell(s) to be measured is strong enough to complete measurements; whether and when the signal received from the cell(s) to be measured exceed threshold(s) configured via interface A or B, or internal UE thresholds; whether and when other conditions configured over interface A or B are satisfied (e.g., UE or cell geographical location, matching of partial parameters like routing area identifier code (RAC), local area code (LAC), primary synchronization code (PSC), physical cell identity (PCI), global cell identity (GCI), Cell Identity, closed subscriber group (CSG), radio access technology (RAT) type, PLMN identity or identities, etc.); whether and when measurement opportunities have been configured in the UE (e.g., measurement gaps); whether the UE is equipped with capabilities (e.g., dual antenna, dual receive chains) to avoid interrupting other traffic/measurement/reporting activities; whether and when incremental consumption can be reduced. Note that in cases where some or all of the required quantities are already available in the UE, the UE may decide not to measure them again. For example, some such quantities may be presented because they were measured before or because they were otherwise supplied to the UE, e.g., UE camps on cell 1 with PSC1 and cell 1's controlling RNC configures the UE with cell 1's identity; the latter camps on cell 2 and the UE is asked to supply the Cell Identity corresponding to the PSC1 neighbor of cell 2; the UE may choose to supply cell 1's identity without measuring it again.

In another example, a UE provides reports of measured and derived quantities. In one aspect, reporting can be via existing messages (e.g., RRC Measurement Report Message, Measurements on Random Access Channel (RACH) information element (IE) of various functions) or via new messages. Reports may be sent on the same interface from which the configuration arrived or on different interfaces, or both (e.g., configuration on interface A, reporting on interface B). The reports can contain quantities detected or read from cells (e.g., Cell Identity, CGI, LAC, RAC, TAC, various PLMN, CSG Split), or derivative quantities (e.g., "PSC did/didn't correspond to the supplied Cell Identity", "UE is not a member of the cell's CSG"), signal quality measures (e.g., common pilot channel (CPICH) received signal code power (RSCP), CPICH Ec/Io (chip energy/interference noise density ratio)). In one example, reports may be incomplete (e.g., Cell Identity is reported but not CSG Split), and the UE may indicate which quantities it failed to report as well as the reason (e.g., "no time to read", "signal not strong enough to read", "information not present"). In another example, reports may contain the above mentioned quantities for zero, one or multiple cells. In another example, the report contains the identity or other characterizing parameters (e.g., Cell Identity, CGI, LAC, RAC, TAC, various PLMN, CSG Split, signal quality, causes why information was/wasn't logged) for the serving cell(s). In another aspect, reports may be immediate or not. Where the reports are not immediate, it may be possible for the UE to identify the time when the measurements were taken, or to omit quantities whose contents are not valid. In case of any omissions, the UE may implicitly or explicitly (e.g., "field xxx contains invalid information") indicate the omissions. In another aspect, the UE may additionally indicate in a message whether additional information is available for retrieval via interface A or B, at which RAN/MDT Server may ask for (a portion of) that additional information. In reporting, the UE may pick times when other activities (e.g., traffic, measurements) are not affected or when incremental battery use is reduced (e.g., in CELL_DCH (dedicated channel), CELL_FACH (forward access channel), etc.). Note that the UE reports may contain some (or all) quantities that have been acquired prior to reception by the UE of the reporting command. It depends on the UE implementation if such reports are appropriate. For example, such previously acquired quantities may have been obtained due to UE autonomous measurement behavior, or due to measurements triggered by prior configurations received by the UE from the same or other cell/RAN/MDT Server, etc., or due to previous UE activity (e.g., camping on a neighbor cell).

In one aspect, a RAN has several functions in this architecture. For example, the RAN may configure UEs to report neighbor cell quantities as explained previously, or to accept collected or serving neighbor cell data. For example, the RAN may configure its OAM to report neighbor cell data, or to accept collected neighbor cell data or controlled cell data. For example, the RAN may configure its CN (Core Network) to report neighbor cell data, or to accept collected neighbor cell data or controlled cell data. For example, the RAN may configure its cells (e.g., NodeB) to report cell data or qualities. In one aspect, such configuration, especially for the CN, may be transparent to the particular partner node over that interface (e.g., transparent to the CN via the RAN information management (RIM) procedure). In one aspect, in case of transparent configuration, the node to which the information is transparent may be supplied with the identity of the RAN node toward which the information is intended. In cases where the immediate interface partner to which the configuration is transparent is not trusted, the source RAN node may encrypt the configuration command.

In another example, the command asking for neighbor cell data may contain: the pilot identities (e.g., PCIs, PSCs) or range of pilots (including any) whose neighbor cell data is requested; the particular neighbor cell data to request (e.g., Identity of cell, e.g., Cell Identity, UTRAN Cell Identifier (UC-ID), CGI); other qualifying quantities of neighbor cells (e.g., CSG ID, PLMN, LAC, RAC, TAC, etc.); signal quality of the cell, if applicable (e.g., CPICH Echo when configuration is sent to UE, transmit power); the neighboring cells of the neighbor cells; the identity of the RAN node controlling a particular cell, and the form of such identity, e.g., logical (e.g., RNC-ID+RAC+PLMN, eNB ID+TAC+PLMN) and transport (e.g., IP address+port); the identity of the cells around which neighbor cell information is required, e.g., Cell Identity+PLMN+RAC, or CGI, etc.; configuration characteristics of the neighbor cells, e.g., whether the controlling RAN node accepts a direct interface or not, whether the controlling RAN node can be subject to incoming commands/reception of notifications (e.g., command to start/shut down/reduce power/increase power/adjust antennas/ability to receive specific self organizing network (SON) messages, etc.), or whether the controlling RAN node can be a generator of outgoing commands/sending of notifications (e.g., notification and to start/shut down/reduce power/increase power/adjust antennas/ability to receive specific SON messages, etc.).

In another example, the command providing for neighbor cell data may contain the pilot identities of controlled or neighbor cells; the particular controlled or neighbor cell data (Identity of cell, e.g., Cell Identity, UC-ID, CGI); other qualifying quantities of neighbor cells (e.g., CSG ID, PLMN, LAC, RAC, TAC, etc.); signal quality of the cell, if applicable (e.g., CPICH Ec/Io when configuration is sent to UE, transmit power); the neighboring cells of the neighbor cells; the identity of the RAN node controlling a particular cell or cells, and the form of such identities, (e.g., logical (RNC-ID+RAC+PLMN, eNB id+TAC+PLMN), transport (IP address+port)). In one aspect, for each set of neighbor cells, the identity of the cells whose neighbor cells are the source of particular information (e.g., from UE, from manual configuration, from network listen module(s)), the confidence in particular information (qualitative or quantitative); configuration characteristics of the cells (e.g., whether the controlling RAN node accepts a direct interface or not; or whether the controlling RAN node can be subject to incoming commands/reception of notifications (e.g., command to start/shut down/reduce power/increase power/adjust antennas/ability to receive specific SON messages, etc.); or whether the controlling RAN node can be generator of outgoing commands/sending of notifications (e.g., notification and to start/shut down/reduce power/increase power/adjust antennas/ability to receive specific SON messages, etc.).

In another aspect, RAN may report to the OAM/CN/UE some or all of the controlled/neighbor cell information requested shown previously. Such report, especially for the CN, may be transparent to the particular partner node over that interface (e.g., transparent to the CN via the RIM procedure). In case of transparent reporting, the node (OAM/CN/UE) to which the information is transparent may be supplied with the identity of the RAN node toward which the information is intended. In cases where the immediate interface partner (e.g., UE) to which the report is transparent is not trusted, the source RAN node may encrypt the report. In one example, the RAN may also report that certain configured information has been determined to be invalid, e.g., when RAN has conflicting information from different sources (e.g., UE reported Cell Identity is not the same as configured by the OAM). If so, the RAN may identify how it has determined the invalidity of the information, either explicitly (e.g., cause values) or via transparent methods (e.g., plaintext string).

In another aspect, the RAN may receive a report or a configuration containing the same type of information as described previously. The RAN may use such information to configure its neighbor list to use for relevant functions (e.g., broadcasting in system information block 11 (SIB11/11bis), configuring UE measurements in connected mode, etc.), or double-check the identity of neighbor cells for various reasons, e.g., periodic verification or Invalid or Missing or Expired or Changed cell data regarding controlled and neighbor cells.

In another aspect, the OAM may be an Operations, Administration management and Provisioning entity for UTRA, E-UTRA, GSM, CDMA2000, or other RAT, for example. In one example, the OAM may query its RAN nodes according to the configuration messages detailed on the RAN function above. For example, the OAM may (transparently or not to intermediary nodes) pass on configuration requests it received from RAN, targeted to another RAN, or the OAM may pass such information directly to the RAN, via peer OAM, or via the Global OAM. In one aspect, the identification of target RAN nodes may be as explained on the RAN function described earlier. The OAM may also identify the source RAN node of particular configuration requests and may configure the MDT server to collect and/or report relevant/missing/unverified pieces of cell information (e.g., neighbors, cell identities, broadcasts, other quantities, etc, as detailed on the RAN functions described earlier).

In another aspect, the OAM may configure peer OAM nodes or the Global OAM with request to report cell information detailed on the RAN function described earlier.

In another aspect, the OAM may report aggregated information to other OAM nodes to the Global OAM, its controlled RAN nodes or its peer OAM nodes. The OAM may report aggregated information either specific to individual configurations requests received from RAN/OAM/Global OAM or may supply some or all cell information as it may deem relevant. When relevant, OAM may omit information, and may supply explicit or implicit reasons why the particular cell information was omitted. The OAM may (transparently or not to intermediary nodes) pass on reports it received from RAN, targeted to another RAN. The OAM may pass such information directly to the RAN, via peer OAM, or via the Global OAM. In one example, identification of target RAN nodes may be as explained on the RAN functions described above. The OAM may also identify the source RAN node of particular report requests.

In another aspect, the OAM may perform aggregation. The OAM may collect information from various sources (peer OAM, Global OAM, MDT Server, RAN, manual configuration) to aggregate neighbor cell configuration. In case aggregated information from various sources conflicts, the OAM may notify a human operator or the global OAM, or an error collection entity (e.g., an error log file, server, etc.) of the conflict, or try to resolve it. Resolution of data conflicts may be based on probabilistic computation on which source is the likeliest one to be correct.

In another aspect, the CN (Core Network) may be a serving GPRS support node (SGSN), mobile switching center (MSC), mobility management entity (MME), or other RAT core network element. CN functions are very similar to OAM functions described previously. In one example, the CN may query its RAN nodes according to the configuration messages detailed earlier on the RAN functions. The CN may (transparently or not to intermediary nodes) pass on configuration requests it received from RAN, targeted to another RAN. The CN may pass such information directly to the RAN, via peer CN that controls the target RAN. Identification of target RAN nodes may be as explained earlier on the RAN functions. The CN may also identify the source RAN node of particular configuration requests (e.g., of transparent transmission in the RIM procedure). The CN may configure peer CN nodes to report cell information, as detailed earlier on the RAN functions.

In another example, the CN may report aggregated information to other CN nodes or, its controlled RAN nodes. The CN may report aggregated information either specific to individual configurations requests received from RAN/CN or may supply some or all cell information as it may deem relevant. When relevant, CN may omit information, and may supply explicit or implicit reasons why the particular cell information was omitted. The CN may (transparently or not to intermediary nodes) pass on reports it received from RAN, targeted to another RAN. The CN may pass such information directly to the RAN, via peer CN. Identification of target RAN nodes may be as explained earlier on the RAN functions. The CN may also identify the source RAN node of particular report requests (e.g., of transparent transmission in the RIM procedure).

In another example, the CN may collect information from various sources (peer CN, RAN, manual configuration) to aggregate neighbor cell configuration. When aggregated information from various sources conflicts, the CN may notify a human operator or an error collection entity (e.g., an error log file, server, etc.) of the conflict, or try to resolve it. Resolution of data conflicts may be based on probabilistic computation on which source is the likeliest one to be correct.

In another aspect, a global OAM (gOAM) may be intra-RAT or inter-RAT with several functions. For example, the gOAM may query its OAM nodes according to the configuration messages detailed earlier on the RAN functions. The gOAM may (transparently or not to intermediary nodes) pass on configuration requests it received from OAM, targeted to another RAN (via another OAM). Identification of target RAN nodes may be as explained earlier on the RAN functions. The gOAM may also identify the source RAN node of particular configuration requests. The gOAM may configure the MDT server to collect and/or report relevant, missing, or unverified pieces of cell information (e.g., neighbors, cell identities, broadcasts, other quantities, etc.), as detailed on the UE and RAN functions earlier.

In another example, the gOAM may report aggregated information to its OAM nodes. The gOAM may report aggregated information either specific to individual configurations requests received from OAM/RAN or may supply some or all cell information as it may deem relevant. When relevant, gOAM may omit information, and may supply explicit or implicit reasons why the particular cell information was omitted. The gOAM may (transparently or not to intermediary nodes) pass on reports it received from RAN, targeted to another RAN. Identification of target RAN nodes may be as explained earlier on the RAN functions. The gOAM may also identify the source RAN node of particular report requests.

In another example, the gOAM may collect information from OAM nodes to aggregate neighbor cell configuration. When aggregated information from various sources conflicts, the CN may notify a human operator or an error collection entity (e.g., an error log file, server, etc.) of the conflict, or try to resolve it. Resolution of data conflicts may be based on probabilistic computation on which source is the likeliest one to be correct.

In another aspect, a MDT Server may be an Open Mobil Alliance device management (OAM DM) Server, corresponding with the UEs as OAM DM clients, with several functions.

For example, the MDTs may configure UEs to collect cell information, as detailed in the UE and RAN functions earlier. The UE may or may not report all information, as detailed in the UE and RAN functions earlier. The MDT may configure UEs to collect only specific information (e.g., Cell Identity, PLMN, CSG ID, etc.) or according to specific (e.g., geographic, PLMN, LAC, RAC, RF, etc) restrictions, possibly as configured implicitly or explicitly by the OAM or gOAM.

In another example, the MDTs may report to the OAM or gOAM information pertinent to the request from OAM or gOAM (e.g., identities and parameters of neighbor cells of particular cells requested by the OAM or gOAM. The requests from OAM or gOAM may be in form similar to the configurations detailed in the UE and RAN functions earlier.

In another example, the MDTs may collect information from UEs to aggregate neighbor cell configuration. When aggregated information from various sources conflicts, the MDTs may notify a human operator or an error collection entity (e.g., an error log file, server, etc.) of the conflict, or try to resolve it. Resolution of data conflicts may be based on probabilistic computation on which source is the likeliest one to be correct.

In another aspect, cells may be entities of cells under the same physical apparatus (e.g., NodeB, base station transceiver (BST)). Note that, in some cases, cells and their controlling RANs are collocated (e.g., NodeB+, HNB, eNB), in which case the interface may be proprietary or a direct hardware interface (e.g., bus, direct pins, etc.).

Cell apparatus (henceforth CellA) has many functions. For example, the CellA may respond to RAN requests for cell information. The configuration of such reporting may be in a logical form similar to the one detailed earlier for the interface A.

In response to a RAN request for cell information, CellA may perform measurements very similar to the ones detailed earlier, with very similar considerations for timing and other conditions. CellA may delegate such measurements to a separate module akin to concept of "Network Listen Module". Additionally CellA may choose to perform measurements at low/no traffic conditions or when no UE is connected, or when large enough measurement (e.g., discontinuous reception (DRX)) gaps are available.

In one aspect, configuration and reporting as taught herein may be performed via newly introduced messages or part of existing messages in all the interfaces, for example, but not limited to any messages corresponding to: RRC Connection Management, Radio Bearer control procedures, RRC connection mobility procedures, RRC Measurement procedures, etc.; RANAP/S1AP Elementary Procedures, RANAP/S1AP RAB Management, RANAP/S1AP Interface Management, RANAP/S1AP Relocation/Handover, RANAP/S1AP Context Management, RANAP/S1AP Paging/Traces/UE Context/Location management, RANAP/S1AP Dedicated connection, Setup/Transfer, RANAP/S1AP Information exchange, etc.; NBAP Elementary Procedures, NBAP Common Procedures, NBAP Dedicated Procedures, etc.; RNSAP Elementary Procedures, RNSAP Basic Mobility Procedures, RNSAP Dedicated Procedures, RNSAP Common Transport Channel Procedures, RNSAP Global Procedures, etc".

One skilled in the art would understand that the list given above is not exclusive or restrictive. Other message examples may be added or some of the message examples listed may be deleted without affecting the scope or spirit of the present disclosure.

In view of the above, it may be seen that neighbor relation information may be acquired and distributed throughout a system in a variety of ways. For further purposes of explanation, several examples of such acquisition and distribution follow.

Radio access network (RAN) nodes, for example, a radio network controller (RNC) cell, NodeB, Home Node B (HNB), etc., can acquire neighboring topology and other information through reading of network parameters of neighboring cells. For example, the reading of network parameters may be achieved via a broadcast or a unicast message and may be conveyed over the air or through a backhaul connection. For example, a backhaul connection may be a connection between a RAN node and the core network (CN) or other RAN nodes. In another example, the backhaul connection may be a connection between a RAN node and a Home Node B Gateway (HNB-GW) or Home NodeB Management System (HMS), or other concentrating nodes.

In another aspect, reading of such network parameters may be obtained by several means: (1) via a module inside a RAN node ("network listen module"); (2) via UE reports capable of reporting the needed network parameters; (3) via information exchange with already discovered neighboring nodes; (4) via configuration by a centralized node, e.g., HNB-GW or HMS.

In another aspect, network parameters useful for the acquisition of network topology may include one or more of the following: identity of neighboring cells; access rights information; path loss information; received signal quality indication; broadcast power information; list of neighbors of the cell whose broadcast information is acquired; cell loading information; amount, number, or proportion of calls/UEs dropped or in poor conditions due to coverage problems; amount, number, or proportion of calls/UEs handed out undesirably; or amount of ping-ponging observed.

In one example, some UEs are already capable of reporting some of the above information, e.g., UEs supporting System Information acquisition for inbound mobility purposes, or UEs supporting "Minimization of Drive Tests" features allowing the UE to report information to the network. In another aspect, a network takes advantage of such UEs.

In another example, exchange of the above network parameters may happen over the backhaul connections mentioned above, via messages, for example, multicast or unicast messages between neighboring RAN nodes. Such messages may be requested by the RAN node or transmitted as needed without request, for example, when RF conditions, loading conditions, coverage conditions, or other conditions warrant it, periodically, or randomly. In one example, such messages may be accompanied by counts (for example, per message or per parameter), which are incremented whenever the message or network parameter traverses a RAN node. In one example, RAN nodes may use the counters to limit the number of messages or judge the relevance of the information being received, in terms of the distance from the originating RAN node. In one example, such counters may be either incremental or may be proportional functions of path loss or other inter-RAN distance measures.

In one aspect, network parameters, if not already existing in messages, may be added. In one example, although it is necessary for end RAN nodes to understand the message contents, other intermediate nodes, e.g., UE, HNB-GW, CN, etc., may transfer the information transparently, that is, without interpretation of the message contents.

In one aspect, the network parameters may be verified prior to being transferred. For example, a verification parameter may be used in the verifying process. One skilled in the art would understand that the verification parameter may be determined based on many factors, such as, but not limited to, application, usage, user choice, system configuration, etc., without limiting the scope or spirit of the present disclosure. In another aspect, the network parameters may be aggregated together prior to being transferred.

In another aspect, the transfer of information between RAN nodes over the backhaul can occur transparently or non-transparently through existing procedures, for example, Radio Access Network Application Part (RANAP) Information Transfer, or through new procedures.

A purpose of the information exchange may be to allow RAN nodes to automate settings of their network parameters, with reduced or no need for explicit configuration of parameters or settings such as: handover parameters (e.g., thresholds, time-to-trigger, hysteresis, triggering event types); reselection parameters (e.g., intersearch thresholds, cell individual offsets); acceptable load (e.g., number of UEs, connections, cell throughput, etc.); connection limits (e.g., throughput, Quality of Service, etc.); transmit power; beamforming; and multiple carrier usage.

Figure 13:
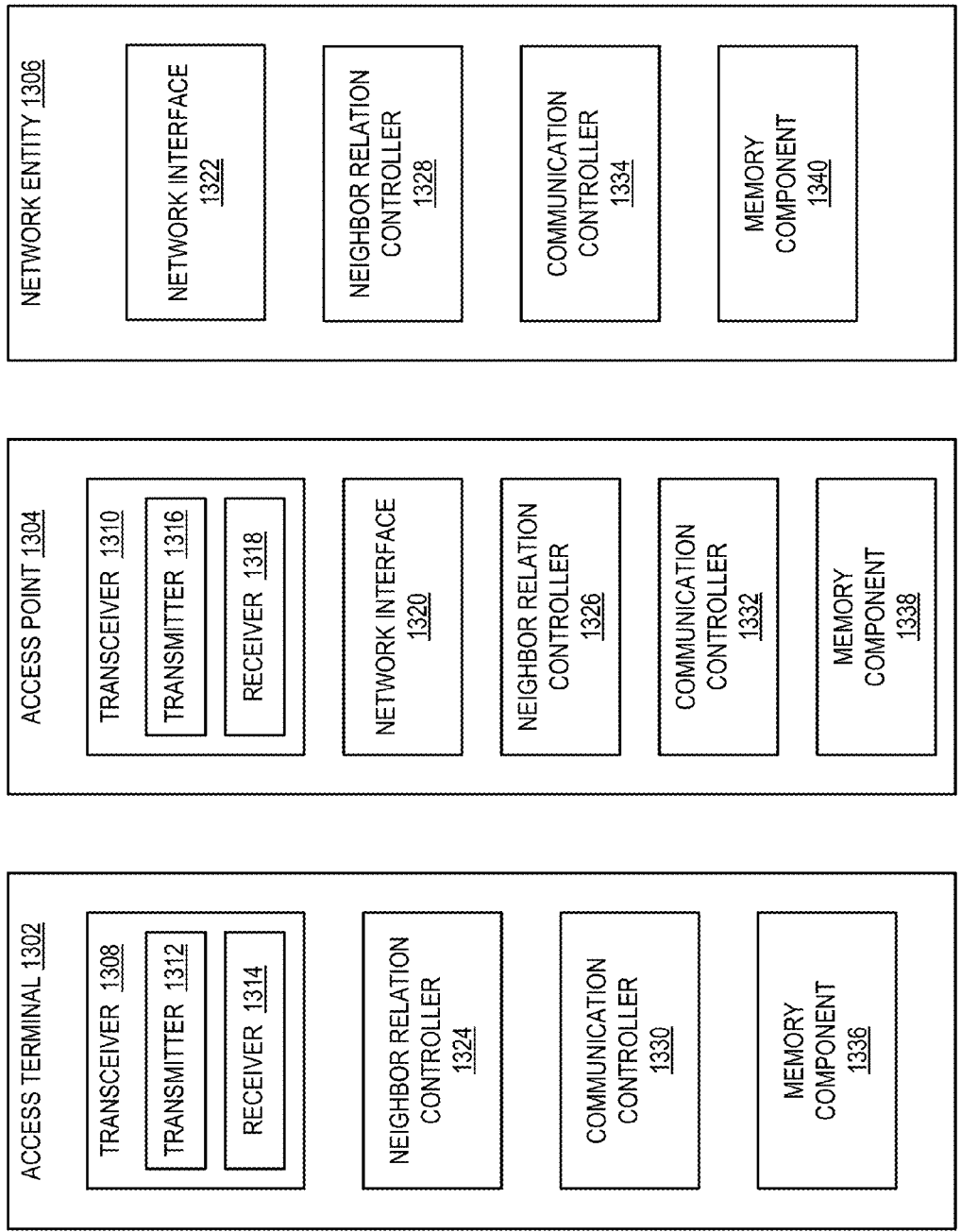
FIG. 13 is a simplified block diagram of several sample aspects of components that may be employed in communication nodes.

FIG. 13 illustrates several sample components (represented by corresponding blocks) that may be incorporated into nodes such as an access terminal 1302, an access point 1304, and a network entity 1306 (e.g., corresponding to the access terminal 102, the access point 104, and the network entity 108, respectively, of FIG. 1) to perform network relation-related operations as taught herein. The described components also may be incorporated into other nodes in a communication system. For example, other nodes in a system may include components similar to those described for the access terminal 1302 and the access point 1304 to provide similar functionality. Also, a given node may contain one or more of the described components. For example, an access terminal may contain multiple transceiver components that enable the access terminal to operate on multiple carriers and/or communicate via different technologies.

As shown in FIG. 13, the access terminal 1302 and the access point 1304 each include one or more transceivers (as represented by a transceiver 1308 and a transceiver 1310, respectively) for communicating with other nodes. Each transceiver 1308 includes a transmitter 1312 for sending signals (e.g., messages, reports, indications, neighbor relation information) and a receiver 1314 for receiving signals (e.g., messages, neighbor relation information, requests, indications, pilot signals, criteria, thresholds) and performing other operations relating to conducting measurements. Similarly, each transceiver 1310 includes a transmitter 1316 for sending signals (e.g., messages, requests, indications, pilot signals, neighbor relation information, criteria, thresholds) and a receiver 1318 for receiving signals (e.g., messages, reports, neighbor relation information, requests, indications).

The access point 1304 and the network entity 1306 each include one or more network interfaces (as represented by a network interface 1320 and a network interface 1322, respectively) for communicating with other nodes (e.g., other network entities). For example, the network interfaces 1320 and 1322 may be configured to communicate with one or more network entities via a wire-based or wireless backhaul. In some aspects, the network interfaces 1320 and 1322 may be implemented as a transceiver (e.g., including transmitter and receiver components) configured to support wire-based or wireless communication (e.g., receiving reports, receiving messages, receiving neighbor relation information, sending messages, sending criteria).

The access terminal 1302, the access point 1304, and the network entity 1306 also include other components that may be used in conjunction with neighbor relation-related operations as taught herein. For example, the access terminal 1302 includes a neighbor relation controller 1324 for managing neighbor relations (e.g., determining that an access terminal is in a defined radio state, determining whether/how to conduct a measurement for neighbor relation information, comparing a received signal to a threshold, acquiring neighbor relation information, determining that not all acquired neighbor relation information can be sent, identifying a time during which the reporting of the neighbor relation information will not impede at least one specified operation, determining whether/how to report neighbor relation information, determining that neighbor relation information is not to be reported immediately, identifying a condition that triggers reporting of stored neighbor relation information) and for providing other related functionality as taught herein. Similarly, the access point 1304 includes a neighbor relation controller 1326 for managing neighbor relations and for providing other related functionality as taught herein. Also, the network entity 1306 includes a neighbor relation controller 1328 for managing neighbor relations and for providing other related functionality as taught herein. The access terminal 1302, the access point 1304, and the network entity 1306 include communication controllers 1330, 1332, and 1334, respectively, for controlling communications (e.g., sending and receiving messages, establishing a direct interface between access points, generating neighbor relation messages) and for providing other related functionality as taught herein. Also, the access terminal 1302, the access point 1304, and the network entity 1306 include memory components 1336, 1338, and 1340 (e.g., each including a memory device), respectively, for maintaining information (e.g., neighbor relation information, thresholds).

For convenience the access terminal 1302 and the access point 1304 are shown in FIG. 13 as including components that may be used in the various examples described herein. In practice, the illustrated blocks may have different functionality in different implementations.

The components of FIG. 13 may be implemented in various ways. In some implementations the components of FIG. 13 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by block 1308 and some or all of the functionality represented by blocks 1324, 1330, and 1326 may be implemented by a processor or processors of an access terminal and data memory of the access terminal (e.g., by execution of appropriate code and/or by appropriate configuration of processor components). Similarly, some of the functionality represented by block 1310 and some or all of the functionality represented by blocks 1320, 1326, 1332, and 1338 may be implemented by a processor or processors of an access point and data memory of the access point (e.g., by execution of appropriate code and/or by appropriate configuration of processor components). Also, some or all of the functionality represented by blocks 1322, 1328, 1334, and 1340 may be implemented by a processor or processors of a network interface and data memory of the network interface (e.g., by execution of appropriate code and/or by appropriate configuration of processor components).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
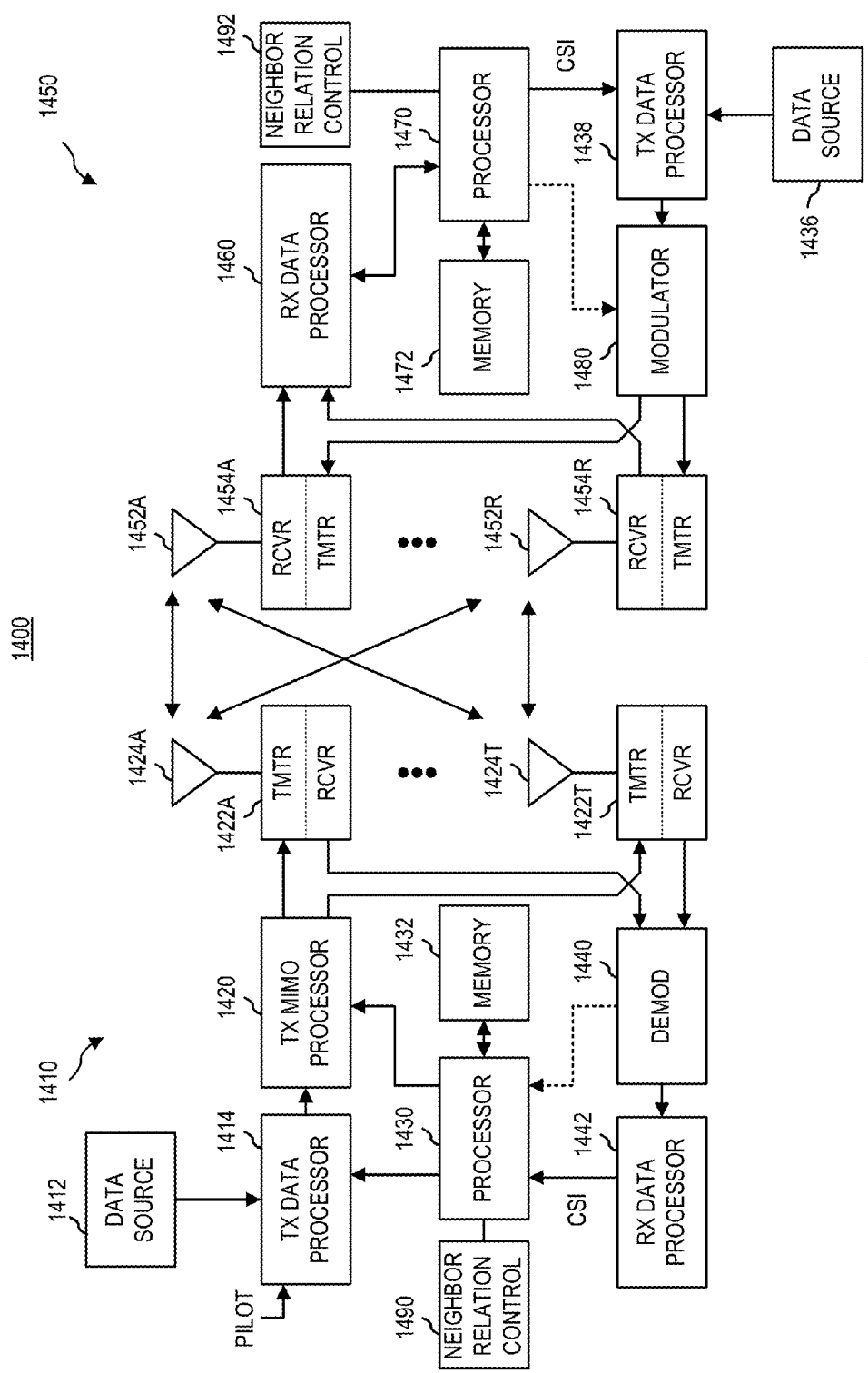
FIG. 14 is a simplified block diagram of several sample aspects of communication components.
Figure 15:
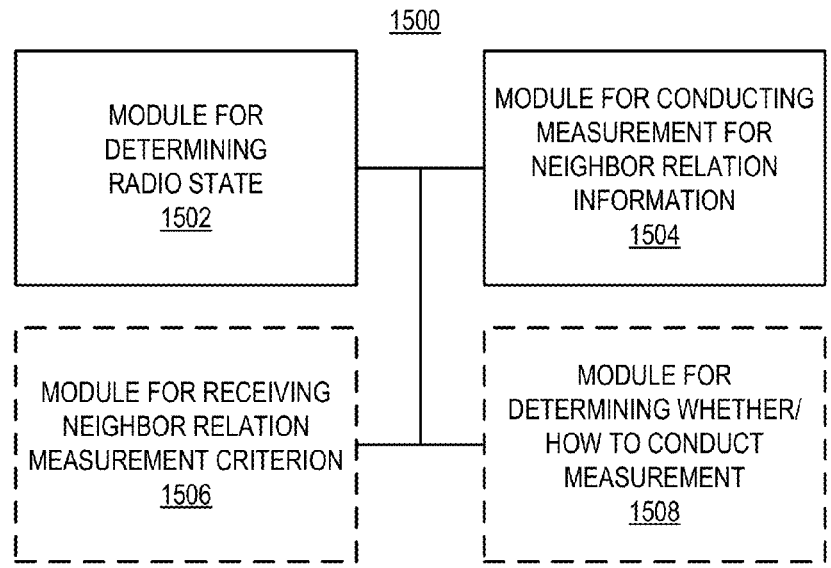
FIGS. 15-21 are simplified block diagrams of several sample aspects of apparatuses configured to manage neighbor relation information as taught herein.
Figure 16:
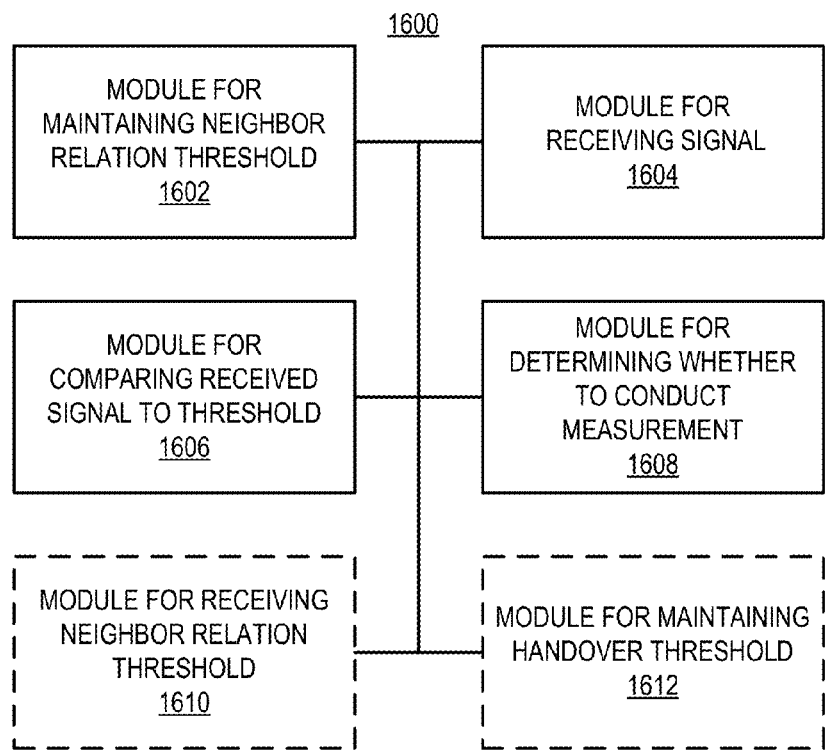
Figure 17:
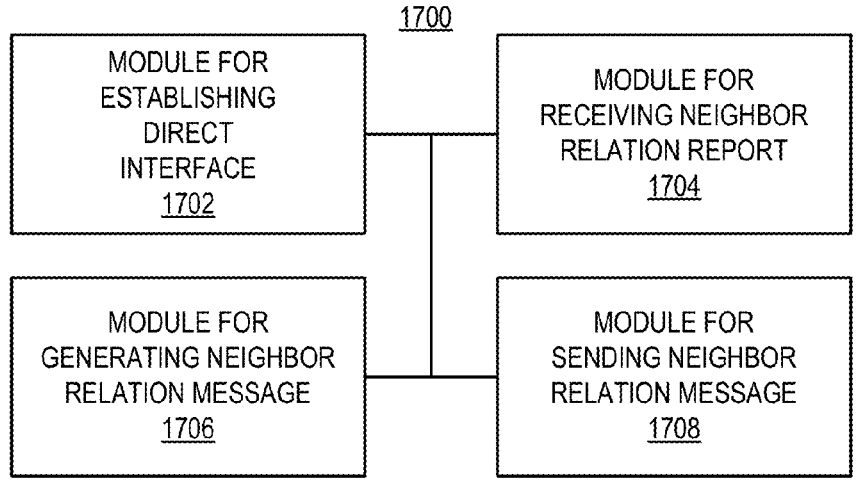
Figure 18:
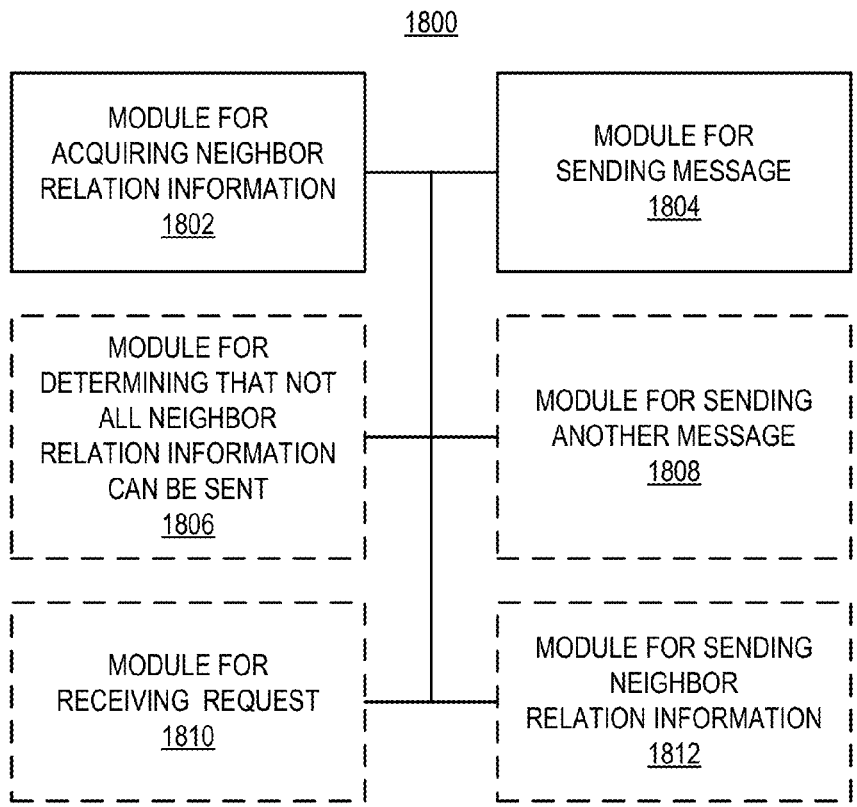
Figure 19:
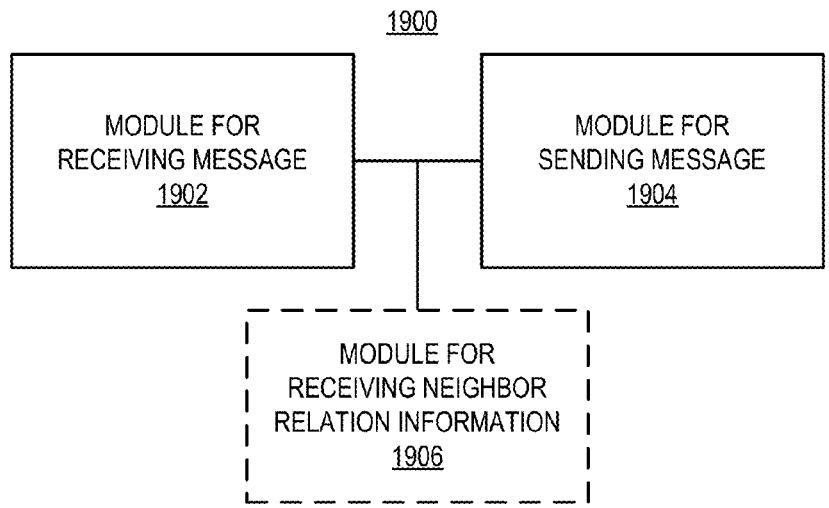
Figure 20:
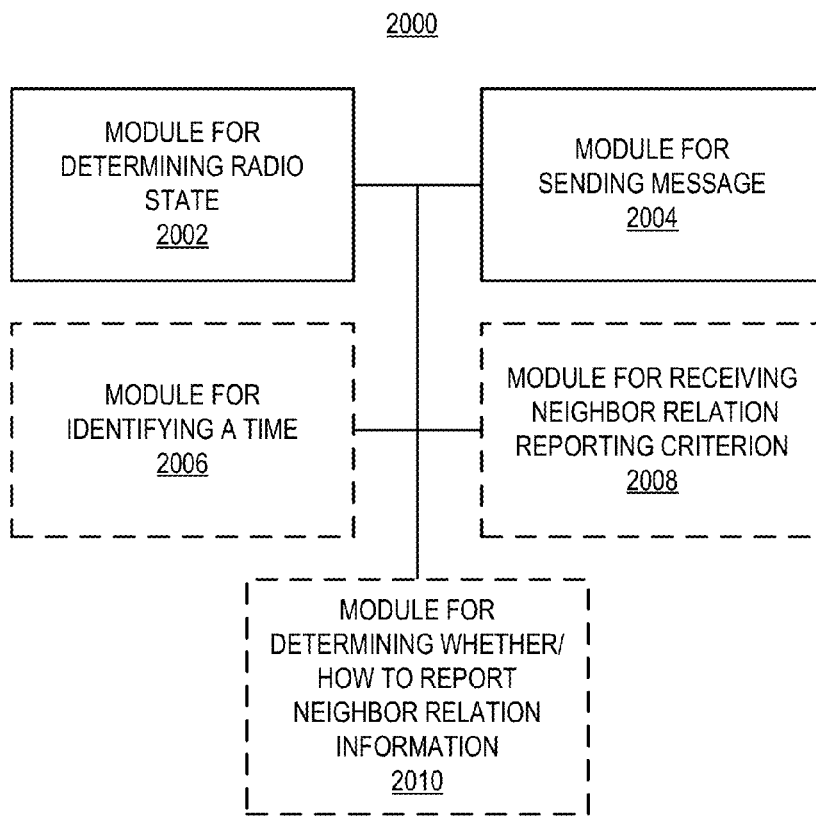
Figure 21:
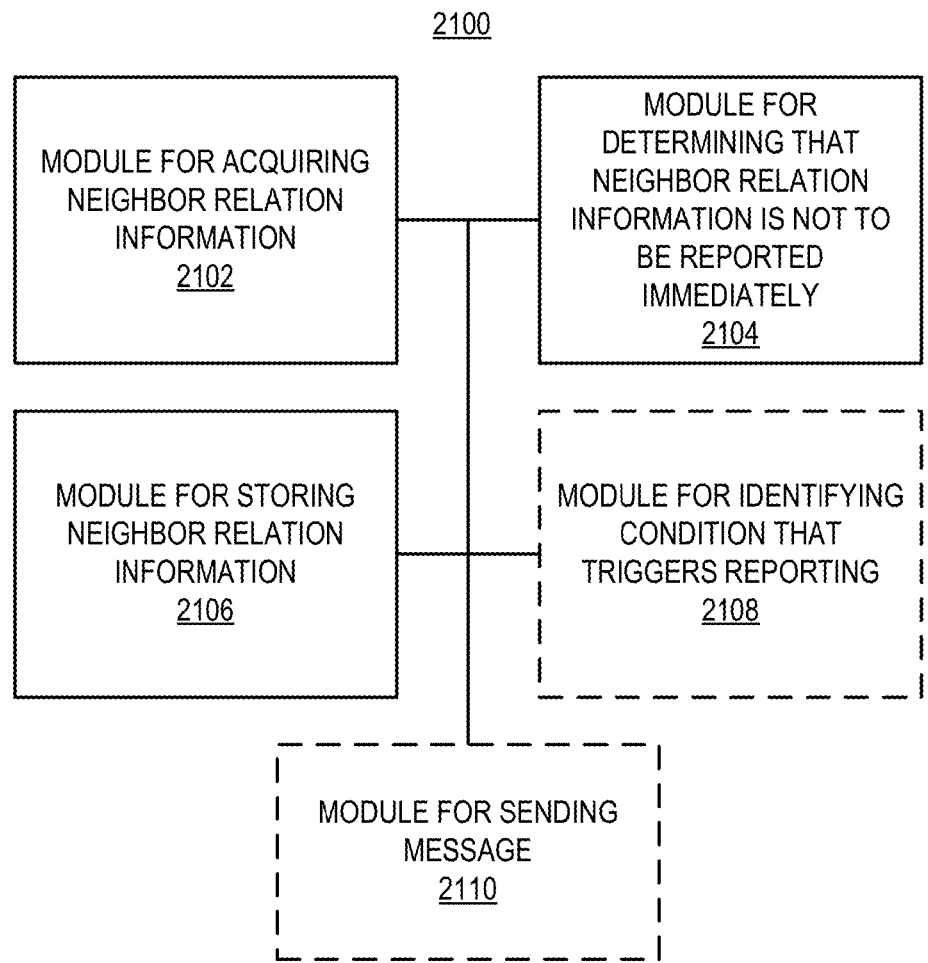

FIG. 14 illustrates a wireless device 1410 (e.g., an access point) and a wireless device 1450 (e.g., an access terminal) of a sample MIMO system 1400. At the device 1410, traffic data for a number of data streams is provided from a data source 1412 to a transmit (TX) data processor 1414. Each data stream may then be transmitted over a respective transmit antenna.

The TX data processor 1414 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers (XCVR) 1422A through 1422T. In some aspects, the TX MIMO processor 1420 applies beamforming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver (XCVR) 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive (RX) data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator (DEMOD) 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform network relation control operations as taught herein. For example, a network relation control component 1490 may cooperate with the processor 1430 and/or other components of the device 1410 to send/receive network relation information to/from another device (e.g., device 1450) as taught herein. Similarly, a network relation control component 1492 may cooperate with the processor 1470 and/or other components of the device 1450 to send/receive network relation information to/from another device (e.g., device 1410). It should be appreciated that for each device 1410 and 1450 the functionality of two or more of the described components may be provided by a single component. For example, a single processing component may provide the functionality of the network relation control component 1490 and the processor 1430 and a single processing component may provide the functionality of the network relation control component 1492 and the processor 1470.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points that reside within the corresponding user residence). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point or other type of access point may provide the same or similar functionality for a larger coverage area. For example, a pico access point may be restricted, a home pico access point may be defined for a given access terminal, and so on.

The functionality described herein (e.g., with regard to one or more of the accompanying figures) may correspond in some aspects to similarly designated "means for" functionality in the appended claims. Referring to FIGS. 15-21, apparatuses 1500, 1600, 1700, 1800, 1900, 2000, and 2100 are represented as a series of interrelated functional modules. Here, a module for determining radio state 1502 may correspond at least in some aspects to, for example, a controller as discussed herein. A module for conducting measurement for neighbor relation information 1504 may correspond at least in some aspects to, for example, a receiver and/or a controller as discussed herein. A module for receiving neighbor relation measurement criterion 1506 may correspond at least in some aspects to, for example, a receiver and/or a controller as discussed herein. A module for determining whether/how to conduct measurement 1508 may correspond at least in some aspects to, for example, a controller as discussed herein. A module for maintaining neighbor relation threshold 1602 may correspond at least in some aspects to, for example, a memory component as discussed herein. A module for receiving signal 1604 may correspond at least in some aspects to, for example, a receiver and/or a controller as discussed herein. A module for comparing received signal to threshold 1606 may correspond at least in some aspects to, for example, a controller as discussed herein. A module for determining whether to conduct measurement 1608 may correspond at least in some aspects to, for example, a controller as discussed herein. A module for receiving neighbor relation threshold 1610 may correspond at least in some aspects to, for example, a receiver and/or a controller as discussed herein. A module for maintaining handover threshold 1612 may correspond at least in some aspects to, for example, a memory component as discussed herein. A module for establishing direct interface 1702 may correspond at least in some aspects to, for example, a controller as discussed herein. A module for receiving neighbor relation report 1704 may correspond at least in some aspects to, for example, a receiver and/or a controller as discussed herein. A module for generating neighbor relation message 1706 may correspond at least in some aspects to, for example, a controller as discussed herein. A module for sending neighbor relation message 1708 may correspond at least in some aspects to, for example, a transmitter and/or a controller as discussed herein. A module for acquiring neighbor relation information 1802 may correspond at least in some aspects to, for example, a controller as discussed herein. A module for sending message 1804 may correspond at least in some aspects to, for example, a transmitter and/or a controller as discussed herein. A module for determining that not all neighbor relation information can be sent 1806 may correspond at least in some aspects to, for example, a controller as discussed herein. A module for sending another message 1808 may correspond at least in some aspects to, for example, a transmitter and/or a controller as discussed herein. A module for receiving request 1810 may correspond at least in some aspects to, for example, a receiver and/or a controller as discussed herein. A module for sending neighbor relation information 1812 may correspond at least in some aspects to, for example, a transmitter and/or a controller as discussed herein. A module for receiving message 1902 may correspond at least in some aspects to, for example, a receiver and/or a controller as discussed herein. A module for sending message 1904 may correspond at least in some aspects to, for example, a transmitter and/or a controller as discussed herein. A module for receiving neighbor relation information 1906 may correspond at least in some aspects to, for example, a receiver and/or a controller as discussed herein. A module for determining radio state 2002 may correspond at least in some aspects to, for example, a controller as discussed herein. A module for sending message 2004 may correspond at least in some aspects to, for example, a transmitter and/or a controller as discussed herein. A module for identifying a time 2006 may correspond at least in some aspects to, for example, a controller as discussed herein. A module for receiving neighbor relation reporting criterion 2008 may correspond at least in some aspects to, for example, a receiver and/or a controller as discussed herein. A module for determining whether/how to report neighbor relation information 2010 may correspond at least in some aspects to, for example, a controller as discussed herein. A module for acquiring neighbor relation information 2102 may correspond at least in some aspects to, for example, a controller as discussed herein. A module for determining that neighbor relation information is not to be reported immediately 2104 may correspond at least in some aspects to, for example, a controller as discussed herein. A module for storing neighbor relation information 2106 may correspond at least in some aspects to, for example, a memory component as discussed herein. A module for identifying condition that triggers reporting 2108 may correspond at least in some aspects to, for example, a controller as discussed herein. A module for sending message 2110 may correspond at least in some aspects to, for example, a transmitter and/or a controller as discussed herein.

The functionality of the modules of FIGS. 15-21 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in 15-21 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A neighbor relation information communication method, comprising:
    establishing a direct interface between a first access point and a second access point;
    receiving a first message indicating that neighbor relation information is available for retrieval from an access terminal;
    sending a second message to the access terminal requesting the neighbor relation information;
    receiving a neighbor relation report including the neighbor relation information from the access terminal at the first access point;
    generating a neighbor relation message including the neighbor relation information of the neighbor relation report; and
    sending the neighbor relation message to the second access point via the direct interface.

2. The method of claim 1, wherein the generation of the neighbor relation message comprises incorporating the received neighbor relation report into the message.

3. The method of claim 1, wherein the generation of the neighbor relation message comprises extracting the neighbor relation information from the received neighbor relation report.

4. The method of claim 1, wherein the neighbor relation information is sent via a radio network subsystem application part signaling protocol.

5. The method of claim 1, wherein the direct interface comprises a UTRAN Iur interface established between the first access point and the second access point.

6. The method of claim 1, wherein the direct interface comprises an E-UTRAN X2 interface established between the first access point and the second access point.

7. The method of claim 1, wherein the first access point and the second access point comprise radio access networks, radio network controllers, NodeBs, or eNodeBs.

8. The method of claim 1, wherein the neighbor relation information comprises at least one of the group consisting of: a cell identifier, a cell global identifier, a location area code, a tracking area code, a routing area code, a public land mobile network identifier, reference signal information, and a signal quality measure.

9. An apparatus for communication, comprising:
    a controller configured to establish a direct interface between the apparatus and an access point;
    a receiver configured to receive a first message indicating that neighbor relation information is available for retrieval from an access terminal;
    a transmitter configured to send a second message to the access terminal requesting the neighbor relation information;
    wherein the receiver is further configured to receive a neighbor relation report including the neighbor relation information from the access terminal;
    wherein the controller is further configured to generate a neighbor relation message including the neighbor relation information of the neighbor relation report; and
    a network interface configured to send the neighbor relation message to the access point via the direct interface.

10. The apparatus of claim 9, wherein the generation of the neighbor relation message comprises incorporating the received neighbor relation report into the message.

11. The apparatus of claim 9, wherein the generation of the neighbor relation message comprises extracting the neighbor relation information from the received neighbor relation report.

12. The apparatus of claim 9, wherein the neighbor relation information is sent via a radio network subsystem application part signaling protocol.

13. The apparatus of claim 9, wherein the direct interface comprises a UTRAN Iur interface established between the apparatus and the access point.

14. The apparatus of claim 9, wherein the direct interface comprises an E-UTRAN X2 interface established between the apparatus and the access point.

15. The apparatus of claim 9, wherein the apparatus and the access point comprise radio access networks, radio network controllers, NodeBs, or eNodeBs.

16. The apparatus of claim 9, wherein the neighbor relation information comprises at least one of the group consisting of: a cell identifier, a cell global identifier, a location area code, a tracking area code, a routing area code, a public land mobile network identifier, reference signal information, and a signal quality measure.

17. An apparatus for communication, comprising:
    means for establishing a direct interface between a the apparatus and an access point;
    means for receiving a first message indicating that neighbor relation information is available for retrieval from an access terminal;
    means for sending a second message to the access terminal requesting the neighbor relation information;
    means for receiving a neighbor relation report including the neighbor relation information from the access terminal;
    means for generating a neighbor relation message including the neighbor relation information of the neighbor relation report; and
    means for sending the neighbor relation message to the access point via the direct interface.

18. The apparatus of claim 17, wherein the neighbor relation information is sent via a radio network subsystem application part signaling protocol.

19. The apparatus of claim 17, wherein the direct interface comprises a UTRAN Iur interface established between the apparatus and the access point.

20. A non-transitory computer-readable medium comprising code for causing a computer to:
    establish a direct interface between a first access point and a second access point;
    receive a first message indicating that neighbor relation information is available for retrieval from an access terminal;
    send a second message to the access terminal requesting the neighbor relation information;
    receive a neighbor relation report including the neighbor relation information from the access terminal at the first access point;
    generate a neighbor relation message including the neighbor relation information of the neighbor relation report; and
    send the neighbor relation message to the second access point via the direct interface.

21. The non-transitory computer-readable medium of claim 20, wherein the neighbor relation information is sent via a radio network subsystem application part signaling protocol.

22. The non-transitory computer-readable medium of claim 20, wherein the direct interface comprises a UTRAN Iur interface established between the first access point and the second access point.

* * * * *